United States Patent
Qiao et al.

(10) Patent No.: US 10,769,133 B2
(45) Date of Patent: Sep. 8, 2020

(54) METHOD AND APPARATUS FOR RECOGNIZING A LOW-QUALITY NEWS RESOURCE, COMPUTER DEVICE AND READABLE MEDIUM

(71) Applicant: BEIJING BAIDU NETCOM SCIENCE AND TECHNOLOGY CO., LTD., Haidian District Beijing (CN)

(72) Inventors: Chao Qiao, Beijing (CN); Bo Huang, Beijing (CN); Daren Li, Beijing (CN); Qiaoqiao She, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 226 days.

(21) Appl. No.: 16/013,476

(22) Filed: Jun. 20, 2018

(65) Prior Publication Data
US 2018/0373751 A1 Dec. 27, 2018

(30) Foreign Application Priority Data
Jun. 21, 2017 (CN) .......................... 2017 1 0474726

(51) Int. Cl.
*G06F 16/00* (2019.01)
*G06F 16/23* (2019.01)
(Continued)

(52) U.S. Cl.
CPC .... *G06F 16/2365* (2019.01); *G06F 16/24578* (2019.01); *G06F 16/353* (2019.01); *G06F 16/55* (2019.01); *G06F 16/9535* (2019.01)

(58) Field of Classification Search
CPC .............................................. G06F 16/24575
See application file for complete search history.

(56) References Cited

U.S. PATENT DOCUMENTS 10,095,752 B1 * 10/2018 Schmitt .................. G06F 17/00
2016/0217144 A1   7/2016 Yu

FOREIGN PATENT DOCUMENTS

| CN | 101369279 A | 2/2009 |
| CN | 103294671 A | 9/2013 |
| CN | 106095735 A | 11/2016 |

OTHER PUBLICATIONS

Chinese Office Action dated Feb. 26, 2020, for related Chinese Appln. No. 201710474726.2; 4 Pages.
(Continued)

*Primary Examiner* — Ajith Jacob
(74) *Attorney, Agent, or Firm* — Brooks Kushman PC

(57) ABSTRACT

The present disclosure provides a method and apparatus for recognizing a low-quality news resource, a computer device and a readable medium. The method comprises: obtaining information of a to-be-recognized news resource; determining whether the to-be-recognized new resource is a low-quality news resource, according to a pre-built low-quality news information repository and the information of the to-be-recognized news resource. The technical solutions of the present disclosure may be employed to automatically recognize whether the to-be-recognized news resource is the low-quality resource through the information of the to-be-recognized news resource such as the text information and/or pictures, and can overcome technical problems in the prior art such as time-consuming and arduous manual-check manner and a low recognition efficiency due to leakage in checking. Through the above technical solutions, present embodiments may achieve automatic check of the to-be-recognized news resource and thereby substantially shorten the time spent in recognizing the low-quality news resource.

18 Claims, 6 Drawing Sheets

(51) Int. Cl.
G06F 16/9535 (2019.01)
G06F 16/2457 (2019.01)
G06F 16/35 (2019.01)
G06F 16/55 (2019.01)

(56) References Cited

OTHER PUBLICATIONS

Chinese Search Report dated Dec. 30, 2019 for related Chinese Appln. No. 2017104747262; 2 Pages.

* cited by examiner

METHOD AND APPARATUS FOR RECOGNIZING A LOW-QUALITY NEWS RESOURCE, COMPUTER DEVICE AND READABLE MEDIUM

The present application claims the priority of Chinese Patent Application No. 201710474726.2, filed on Jun. 21, 2017, with the title of "Method and apparatus for recognizing a low-quality article based on artificial intelligence, device and medium". The disclosure of the above applications is incorporated herein by reference in its entirety.

FIELD OF THE DISCLOSURE

The present disclosure relates to the technical field of computer application, and particularly to a method and apparatus for recognizing a low-quality news resource, a computer device and a readable medium.

BACKGROUND OF THE DISCLOSURE

As mobile Internet technologies develop and the use of mobile terminals prevail, many news-recommending systems spring up in the market to enable a user to more conveniently browse various latest news resources in time through a mobile terminal. The news-recommending system may learn about the user's interest according to the user's self-portrait, and thereby recommend articles of the user's interest to the user purposefully according to the user's interest. However, in the prior art, articles included in the news-recommending system are of different quality, they might include some authoritative high-quality articles, or some crude and fake news, or some low-quality articles which are intended to attract the user's attention and contravene facts. Therefore, it is necessary to check quality of news content in the news-recommending systems.

In the current news-recommending systems, there often occurs a phenomenon that news resources of lower quality are often plagiarized mutually and appear repeatedly. For example, a piece of news that already proves fake news might be slightly modified by some ill-intended news authors and issued repeatedly to attract readers' attention and cheat readers in clicking. At present, some problems about repeated appearance of low-quality news resources with similar content are mainly solved by manually checking many times, with a very low efficiency.

However, low-quality news resources appearing repeatedly by plagiarism in the news-recommending systems are recognized in a manually-checking manner in the prior art. However, regarding a news-recommending system with a great deal of news increased every day, the manually-checking manner is time-consuming and arduous, might be confronted with miss in check, and causes a very low recognition efficiency of low-quality news resources.

SUMMARY OF THE DISCLOSURE

The present disclosure provides a method and apparatus for recognizing a low-quality news resource, a computer device and a readable medium, to improve the efficiency of recognizing low-quality news resource.

The present disclosure provides a method for recognizing a low-quality news resource, the method comprising:
obtaining information of a to-be-recognized news resource;
determining whether the to-be-recognized new resource is a low-quality news resource, according to a pre-built low-quality news information repository and the information of the to-be-recognized news resource.

Further optionally, in the above-mentioned method, if the to-be-recognized news resource only includes text information, the obtaining information of a to-be-recognized news resource specifically comprises: obtaining text information of the to-be-recognized news resource;

the determining whether the to-be-recognized new resource is a low-quality news resource, according to a pre-built low-quality news information repository and the information of the to-be-recognized news resource specifically comprises:

recognizing whether the text information of the to-be-recognized news resource is a low-quality news text, according to the pre-built low-quality news text repository and the text information of the to-be-recognized news resource; if yes, determining that the to-be-recognized news resource is a low-quality news resource; if no, determining that the to-be-recognized news resource is a non-low-quality news resource;

if the to-be-recognized news resource only includes pictures, the obtaining information of a to-be-recognized news resource specifically comprises: obtaining pictures of the to-be-recognized news resource;

the determining whether the to-be-recognized new resource is a low-quality news resource, according to a pre-built low-quality news information repository and the information of the to-be-recognized news resource specifically comprises:

recognizing whether the pictures of the to-be-recognized news resource are low-quality pictures, according to a low-quality news picture library and the pictures of the to-be-recognized news resource; if yes, determining that the to-be-recognized news resource is the low-quality news resource; if no, determining that the to-be-recognized news resource is the non-low-quality news resource;

if the to-be-recognized news resource includes text information and pictures, the obtaining information of a to-be-recognized news resource specifically comprises: obtaining the text information and pictures of the to-be-recognized news resource;

the determining whether the to-be-recognized new resource is a low-quality news resource, according to a pre-built low-quality news information repository and the information of the to-be-recognized news resource specifically comprises:

determining that whether the to-be-recognized news resource is the low-quality news resource, according to the pre-built low-quality news text repository, low-quality news picture library, and the text information and pictures of the to-be-recognized news resource;

furthermore, the determining that whether the to-be-recognized news resource is the low-quality news resource, according to the pre-built low-quality news text repository, low-quality news picture library, and the text information and pictures of the to-be-recognized news resource specifically comprises:

recognizing whether the text information of the to-be-recognized news resource is the low-quality news text, according to the pre-built low-quality news text repository and the text information of the to-be-recognized news resource;

recognizing whether the pictures of the to-be-recognized news resource are low-quality pictures, according to the pre-built low-quality news picture library and the pictures of the to-be-recognized news resource;

if the text information of the to-be-recognized news resource is the low-quality news text and/or the pictures of the to-be-recognized news resource are low-quality pictures, determining that the to-be-recognized news resource is the low-quality news resource; otherwise, determining that the to-be-recognized news resource is the non-low-quality news resource.

Further optionally, in the above method, the recognizing whether the text information of the to-be-recognized news resource is a low-quality news text, according to the pre-built low-quality news text repository and the text information of the to-be-recognized news resource specifically comprises:

extracting, from the text information of the to-be-recognized news resource, a plurality of feature words that are capable of identifying the to-be-recognized news resource;

according to the plurality of feature words and a pre-obtained inverted index of the low-quality news text repository, obtaining, from the low-quality news text repository, a plurality of low-quality news texts including at least one feature word of the plurality of feature words, as alternative low-quality news text, and obtaining a plurality of alternative low-quality news texts;

making statistics of weighs of respective feature words in the plurality of feature words in the text information of the to-be-recognized news resource; and obtaining, from the inverted index of the low-quality news text repository, weights of the respective feature words in respective alternative low-quality news texts;

obtaining N candidate low-quality news texts from a plurality of alternative low-quality news texts, according to weights of feature words in the plurality of feature words in the text information of the to-be-recognized news resource, and weights of the feature words in respective alternative low-quality news texts;

with a paragraph as a granularity, calculating a text similarity between the to-be-recognized news resource and each candidate low-quality news text;

performing normalization processing for the text similarity between the to-be-recognized news resource and each candidate low-quality news text;

judging whether a similarity value larger than a preset similarity threshold exists in respective text similarity values after the normalization processing, and if yes, determining that the text information of the to-be-recognized news resource is the low-quality news text; if no, determining that the text information of the to-be-recognized news resource is the non-low-quality news text.

Further optionally, in the above-mentioned method, the obtaining N candidate low-quality news texts from a plurality of alternative low-quality news texts, according to weights of feature words in the plurality of feature words in the text information of the to-be-recognized news resource, and weights of the feature words in respective alternative low-quality news texts specifically comprises:

calculating a relevancy score of the text information of the to-be-recognized news resource and respective alternative low-quality news texts, according to the weights of feature words in the plurality of feature words in the text information of the to-be-recognized news resource, and the weights of the feature words in respective alternative low-quality news texts;

obtaining top N largest relevancy scores from the plurality of relevancy scores;

obtaining N alternative low-quality news texts corresponding to the top N largest relevancy scores, as N candidate low-quality news texts.

Further optionally, in the above-mentioned method, the calculating a relevancy score of the text information of the to-be-recognized news resource and respective alternative low-quality news texts, according to the weights of feature words in the plurality of feature words in the text information of the to-be-recognized news resource, and the weights of the feature words in respective alternative low-quality news texts specifically comprises:

regarding each candidate low-quality news text, multiplying a word frequency of feature words in the plurality of feature words in the text information of the to-be-recognized news resource by a word frequency of corresponding feature words in corresponding alternative low-quality news texts and an inverse file frequency of corresponding feature words, and summating multiplication results corresponding to the plurality of feature words, and regarding the sum as the relevancy score of the text information of the to-be-recognized news resource and the corresponding alternative low-quality news text.

Further optionally, in the above-mentioned method, the step of, with a paragraph as a granularity, calculating a text similarity between the to-be-recognized news resource and each candidate low-quality news text specifically comprises:

with a paragraph as a granularity, obtaining a first sparsity representation and a first density representation of each paragraph of a plurality of paragraphs in each candidate low-quality news text;

with a paragraph as a granularity, obtaining a second sparsity representation and a second density representation of each paragraph of a plurality of paragraphs in the text information of the to-be-recognized news resource;

regarding paragraphs in each candidate low-quality news text and paragraphs in the text information of the to-be-recognized news resource, calculating a first paragraph similarity between corresponding paragraph pairs using a cosine distance, according to the first sparsity representation of paragraphs in the corresponding candidate low-quality news text and the second sparsity representation of paragraphs in the text information of the to-be-recognized news resource;

regarding paragraphs in each candidate low-quality news text and paragraphs in the text information of the to-be-recognized news resource, calculating a second paragraph similarity between corresponding paragraph pairs using a KL divergence, according to the first density representation of paragraphs in corresponding candidate low-quality resources and the second density representation of paragraphs in the text information of the to-be-recognized news resource;

regarding paragraphs in each candidate low-quality news text and paragraphs in the text information of the to-be-recognized news resource, calculating a third similarity between each paragraph pair according to the first paragraph similarity and the second paragraph similarity between corresponding paragraph pairs, a parameter proportion of the sparsity representation and a parameter proportion of the density representation; a sum of the parameter proportion of the sparsity representation and the parameter proportion of the density representation is equal to 1;

regarding paragraphs in each candidate low-quality news texts and paragraphs in the text information of the to-be-recognized news resource, multiplying the third similarity between corresponding paragraphs by a sum of lengths of two paragraphs included in the corresponding paragraph pair, to obtain a fourth similarity between each paragraph pair;

regarding each candidate low-quality news texts and the text information of the to-be-recognized news resource, obtaining top M largest fourth similarities from a plurality of fourth similarities corresponding to corresponding plurality of paragraph pairs;

regarding each of said candidate low-quality news texts and the text information of the to-be-recognized news resource, averaging the corresponding M fourth similarities, as the text similarity between the text information of the to-be-recognized news resource and the corresponding candidate low-quality news text.

Further optionally, in the above-mentioned method, the step of, with a paragraph as a granularity, obtaining a first sparsity representation and a first density representation of each paragraph of a plurality of paragraphs in each candidate low-quality news text specifically comprises:

generating the first sparsity representation of each paragraph in each candidate low-quality news text, according to first segmented words included in all paragraphs of each candidate low-quality news text in the low-quality news text repository, and weights of the first segmented words;

according to a subject classification model obtained by pre-learning, predicting a probability of each paragraph in the plurality of paragraphs in each candidate low-quality news text on each preset subject class; and generating the first density representation of each paragraph of each candidate low-quality news text, according to the probability of each paragraph in each candidate low-quality news text on each preset subject class.

Further optionally, in the above-mentioned method, the step of, with a paragraph as a granularity, obtaining a second sparsity representation and a second density representation of each paragraph of a plurality of paragraphs in the text information of the to-be-recognized news resource specifically comprises:

performing word segmentation for each paragraph in the text information of the to-be-recognized news resource, and filtering away stop words to obtain a plurality of second segmented words included in respective paragraphs;

making statistics of weights of respective second segmented words in the respective paragraphs of the text information of the to-be-recognized news resource;

generating the second sparsity representation of corresponding paragraphs in the text information of the to-be-recognized news resource, according to the weights of respective second segmented words in paragraphs of the text information of the to-be-recognized news resource;

according to a subject classification model, predicting the probability of paragraphs of the text information of the to-be-recognized news resource on preset subject classes; and generating a second density representation of each paragraph of the text information of the to-be-generated news resource, according to the probability of each paragraph of the text information of the to-be-recognized news resource on respective preset subject classes.

Further optionally, in the above-mentioned method, before the step of, according to the plurality of feature words and a pre-obtained inverted index of the low-quality news text repository, obtaining, from the low-quality news text repository, a plurality of low-quality news texts including at least one feature word of the plurality of feature words, as alternative low-quality news text, and obtaining a plurality of alternative low-quality news texts, the method further comprises:

collecting a plurality of low-quality news texts and generating the low-quality news text repository;

performing word segmentation for paragraphs in the low-quality news text, filtering away stop words, and obtaining a plurality of first segmented words included in respective paragraphs;

making statistics of weights of respective first segmented words in the respective paragraphs in the low-quality news texts;

storing, in the low-quality news text repository, the weights of respective first segmented words in the respective paragraphs in each low-quality news text.

Further optionally, in the above-mentioned method, after collecting a plurality of low-quality news texts and generating the low-quality news text repository, the method further comprises:

extracting all included segmented words from each low-quality news text in the low-quality news text repository;

establishing the inverted index between respective segmented words and identifiers of low-quality news texts including corresponding segmented words;

making statistics of weights of respective segmented words in the low-quality news texts including corresponding segmented words;

storing, in the inverted index, weights of respective segmented words in the low-quality news texts including corresponding segmented words.

Further optionally, in the above-mentioned method, the recognizing whether the pictures of the to-be-recognized news resource are low-quality pictures, according to the pre-built low-quality news picture library and the pictures of the to-be-recognized news resource specifically comprises:

calculating feature vectors of pictures of the to-be-recognized news resource;

obtaining the feature vectors of low-quality pictures from the low-quality news picture library;

calculating Hamming distances of the feature vectors of pictures of the to-be-recognized news resource and the feature vectors of the low-quality pictures;

judging whether a Hamming distance smaller than a Hamming distance threshold corresponding to the type of the corresponding low-quality picture exists in the Hamming distances of the feature vectors of pictures of the to-be-recognized news resource and the feature vectors of the low-quality pictures;

if yes, determining that the pictures of the to-be-recognized news resource are low-quality pictures, and otherwise determining that the pictures of the to-be-recognized news resource are non-low-quality pictures.

Furthermore, in the above-mentioned method, the recognizing whether the pictures of the to-be-recognized news resource are low-quality pictures, according to the pre-built low-quality news picture library and the pictures of the to-be-recognized news resource specifically comprises:

organizing feature vectors of a plurality of low-quality pictures in the low-quality news picture library on a KD-tree;

calculating feature vectors of pictures of the to-be-recognized news resource;

by searching on the KD-tree, obtaining the feature vector of the low-quality picture proximate to the feature vectors of pictures of the to-be-recognized news resource;

calculating Hamming distances of the feature vectors of pictures of the to-be-recognized news resource and the feature vector of the proximate low-quality picture;

judging whether the Hamming distances of the feature vectors of pictures of the to-be-recognized news resource and the feature vector of the proximate low-quality picture are smaller than a Hamming distance threshold corresponding to the type of the corresponding proximate low-quality picture;

if yes, determining that the pictures of the to-be-recognized news resource are low-quality pictures, and otherwise determining that the pictures of the to-be-recognized news resource are non-low-quality pictures.

Further optionally, the above-mentioned method, before the recognizing whether the pictures of the to-be-recognized news resource are low-quality pictures, according to the pre-built low-quality news picture library and the pictures of the to-be-recognized news resource, the method further comprises:

collecting a plurality of low-quality pictures and generating the low-quality news picture library;

using a scale-invariant feature transform calculating method to calculate a feature vector of each low-quality picture;

storing the feature vector of each low-quality picture in the low-quality news picture library;

receiving a type marked by the user for the low-quality picture, the type including character, animation image or black-and-white image;

storing the type of each low-quality picture in the low-quality news picture library;

receiving a Hamming distance threshold set by the user for each type of low-quality picture;

storing, in the low-quality news picture library, the Hamming distance threshold corresponding to said each type of low-quality picture The present disclosure provides an apparatus for recognizing a low-quality news resource, the apparatus comprising:

an obtaining module configured to obtain information of a to-be-recognized news resource;

a recognition module configured to determine whether the to-be-recognized new resource is a low-quality news resource, according to a pre-built low-quality news information repository and the information of the to-be-recognized news resource.

Further optionally, in the above-mentioned apparatus, if the to-be-recognized news resource only includes text information, the obtaining module is specifically configured to obtain text information of the to-be-recognized news resource;

correspondingly, the recognition module is specifically configured to:

recognize whether the text information of the to-be-recognized news resource is a low-quality news text, according to the pre-built low-quality news text repository and the text information of the to-be-recognized news resource; if yes, determine that the to-be-recognized news resource is a low-quality news resource; if no, determine that the to-be-recognized news resource is a non-low-quality news resource;

if the to-be-recognized news resource only includes pictures, the obtaining module is specifically configured to obtain pictures of the to-be-recognized news resource;

correspondingly, the recognition module is specifically configured to:

recognize whether the pictures of the to-be-recognized news resource are low-quality pictures, according to a low-quality news picture library and the pictures of the to-be-recognized news resource; if yes, determine that the to-be-recognized news resource is the low-quality news resource; if no, determine that the to-be-recognized news resource is the non-low-quality news resource;

if the to-be-recognized news resource includes text information and pictures, the obtaining module is specifically configured to obtain the text information and pictures of the to-be-recognized news resource;

correspondingly, the recognition module is specifically configured to: determine that whether the to-be-recognized news resource is the low-quality news resource, according to the pre-built low-quality news text repository, low-quality news picture library, and the text information and pictures of the to-be-recognized news resource;

furthermore, the recognition module is specifically configured to:

recognize whether the text information of the to-be-recognized news resource is the low-quality news text, according to the pre-built low-quality news text repository and the text information of the to-be-recognized news resource;

recognize whether the pictures of the to-be-recognized news resource are low-quality pictures, according to the pre-built low-quality news picture library and the pictures of the to-be-recognized news resource;

if the text information of the to-be-recognized news resource is the low-quality news text and/or the pictures of the to-be-recognized news resource are low-quality pictures, determine that the to-be-recognized news resource is the low-quality news resource; otherwise, determine that the to-be-recognized news resource is the non-low-quality news resource.

Further optionally, in the apparatus, the recognition module is specifically configured to:

extract, from the text information of the to-be-recognized news resource, a plurality of feature words that are capable of identifying the to-be-recognized news resource;

according to the plurality of feature words and a pre-obtained inverted index of the low-quality news text repository, obtain, from the low-quality news text repository, a plurality of low-quality news texts including at least one feature word of the plurality of feature words, as alternative low-quality news text, and obtain a plurality of alternative low-quality news texts;

make statistics of weighs of respective feature words in the plurality of feature words in the text information of the to-be-recognized news resource; and obtain, from the inverted index of the low-quality news text repository, weights of the respective feature words in respective alternative low-quality news texts;

obtain N candidate low-quality news texts from a plurality of alternative low-quality news texts, according to weights of feature words in the plurality of feature words in the text information of the to-be-recognized news resource, and weights of the feature words in respective alternative low-quality news texts;

with a paragraph as a granularity, calculate a text similarity between the to-be-recognized news resource and each candidate low-quality news text;

perform normalization processing for the text similarity between the to-be-recognized news resource and each candidate low-quality news text;

judge whether a similarity value larger than a preset similarity threshold exists in respective text similarity values after the normalization processing, and if yes, determine that the text information of the to-be-recognized news resource is the low-quality news text; if no, determine that the text information of the to-be-recognized news resource is the non-low-quality news text.

Further optionally, in the apparatus, the recognition module is specifically configured to:

calculate a relevancy score of the text information of the to-be-recognized news resource and respective alternative low-quality news texts, according to the weights of feature words in the plurality of feature words in the text information of the to-be-recognized news resource, and the weights of the feature words in respective alternative low-quality news texts;

obtain top N largest relevancy scores from the plurality of relevancy scores;

obtain N alternative low-quality news texts corresponding to the top N largest relevancy scores, as N candidate low-quality news texts.

Further optionally, in the apparatus, the recognition module is specifically configured to:

regarding each candidate low-quality news text, multiply a word frequency of feature words in the plurality of feature words in the text information of the to-be-recognized news resource by a word frequency of corresponding feature words in corresponding alternative low-quality news texts and an inverse file frequency of corresponding feature words, and summate multiplication results corresponding to the plurality of feature words, and regard the sum as the relevancy score of the text information of the to-be-recognized news resource and the corresponding alternative low-quality news text.

Further optionally, in the apparatus, the recognition module is specifically configured to:

with a paragraph as a granularity, obtain a first sparsity representation and a first density representation of each paragraph of a plurality of paragraphs in each candidate low-quality news text;

with a paragraph as a granularity, obtain a second sparsity representation and a second density representation of each paragraph of a plurality of paragraphs in the text information of the to-be-recognized news resource;

regarding paragraphs in each candidate low-quality news text and paragraphs in the text information of the to-be-recognized news resource, calculate a first paragraph similarity between corresponding paragraph pairs using a cosine distance, according to the first sparsity representation of paragraphs in the corresponding candidate low-quality news text and the second sparsity representation of paragraphs in the text information of the to-be-recognized news resource;

regarding paragraphs in each candidate low-quality news text and paragraphs in the text information of the to-be-recognized news resource, calculate a second paragraph similarity between corresponding paragraph pairs using a KL divergence, according to the first density representation of paragraphs in corresponding candidate low-quality resources and the second density representation of paragraphs in the text information of the to-be-recognized news resource;

regarding paragraphs in each candidate low-quality news text and paragraphs in the text information of the to-be-recognized news resource, calculate a third similarity between each paragraph pair according to the first paragraph similarity and the second paragraph similarity between corresponding paragraph pairs, a parameter proportion of the sparsity representation and a parameter proportion of the density representation; a sum of the parameter proportion of the sparsity representation and the parameter proportion of the density representation is equal to 1;

regarding paragraphs in each candidate low-quality news texts and paragraphs in the text information of the to-be-recognized news resource, multiply the third similarity between corresponding paragraphs by a sum of lengths of two paragraphs included in the corresponding paragraph pair, to obtain a fourth similarity between each paragraph pair;

regarding each candidate low-quality news texts and the text information of the to-be-recognized news resource, obtain top M largest fourth similarities from a plurality of fourth similarities corresponding to corresponding plurality of paragraph pairs;

regarding each of said candidate low-quality news texts and the text information of the to-be-recognized news resource, average the corresponding M fourth similarities, as the text similarity between the text information of the to-be-recognized news resource and the corresponding candidate low-quality news text.

Further optionally, in the apparatus, the recognition module is specifically configured to:

generate the first sparsity representation of each paragraph in each candidate low-quality news text, according to first segmented words included in all paragraphs of each candidate low-quality news text in the low-quality news text repository, and weights of the first segmented words;

according to a subject classification model obtained by pre-learning, predict a probability of each paragraph in the plurality of paragraphs in each candidate low-quality news text on each preset subject class; and generate the first density representation of each paragraph of each candidate low-quality news text, according to the probability of each paragraph in each candidate low-quality news text on each preset subject class.

Further optionally, in the apparatus, the recognition module is specifically configured to:

perform word segmentation for each paragraph in the text information of the to-be-recognized news resource, and filter away stop words to obtain a plurality of second segmented words included in respective paragraphs;

make statistics of weights of respective second segmented words in the respective paragraphs of the text information of the to-be-recognized news resource;

generate the second sparsity representation of corresponding paragraphs in the text information of the to-be-recognized news resource, according to the weights of respective second segmented words in paragraphs of the text information of the to-be-recognized news resource;

according to a subject classification model, predict the probability of paragraphs of the text information of the to-be-recognized news resource on preset subject classes; and generate a second density representation of each paragraph of the text information of the to-be-generated news resource, according to the probability of each paragraph of the text information of the to-be-recognized news resource on respective preset subject classes.

Further optionally, the above apparatus further comprises: a text repository processing module configured to:

collect a plurality of low-quality news texts and generate the low-quality news text repository;

perform word segmentation for paragraphs in the low-quality news text, filter away stop words, and obtain a plurality of first segmented words included in respective paragraphs;

make statistics of weights of respective first segmented words in the respective paragraphs in the low-quality news texts;

store, in the low-quality news text repository, the weights of respective first segmented words in the respective paragraphs in each low-quality news text.

Further optionally, in the above-mentioned apparatus, the text repository processing module is further configured to:

extract all included segmented words from each low-quality news text in the low-quality news text repository;

establish the inverted index between respective segmented words and identifiers of low-quality news texts including corresponding segmented words;

make statistics of weights of respective segmented words in the low-quality news texts including corresponding segmented words;

store, in the inverted index, weights of respective segmented words in the low-quality news texts including corresponding segmented words.

Further optionally, in the above-mentioned apparatus, the recognition module is specifically configured to:

calculate feature vectors of pictures of the to-be-recognized news resource;

obtain the feature vectors of low-quality pictures from the low-quality news picture library;

calculate Hamming distances of the feature vectors of pictures of the to-be-recognized news resource and the feature vectors of the low-quality pictures;

judge whether a Hamming distance smaller than a Hamming distance threshold corresponding to the type of the corresponding low-quality picture exists in the Hamming distances of the feature vectors of pictures of the to-be-recognized news resource and the feature vectors of the low-quality pictures;

if yes, determine that the pictures of the to-be-recognized news resource are low-quality pictures, and otherwise determine that the pictures of the to-be-recognized news resource are non-low-quality pictures.

Furthermore, in the above-mentioned apparatus, the recognition module is specifically configured to:

organize feature vectors of a plurality of low-quality pictures in the low-quality news picture library on a KD-tree;

calculate feature vectors of pictures of the to-be-recognized news resource;

by searching on the KD-tree, obtain the feature vector of the low-quality picture proximate to the feature vectors of pictures of the to-be-recognized news resource;

calculate Hamming distances of the feature vectors of pictures of the to-be-recognized news resource and the feature vector of the proximate low-quality picture;

judge whether the Hamming distances of the feature vectors of pictures of the to-be-recognized news resource and the feature vector of the proximate low-quality picture are smaller than a Hamming distance threshold corresponding to the type of the corresponding proximate low-quality picture;

if yes, determine that the pictures of the to-be-recognized news resource are low-quality pictures, and otherwise determine that the pictures of the to-be-recognized news resource are non-low-quality pictures.

Further optionally, the above-mentioned apparatus further comprises: a picture library processing module configured to:

collect a plurality of low-quality pictures and generate the low-quality news picture library;

use a scale-invariant feature transform calculating method to calculate a feature vector of each low-quality picture;

store the feature vector of each low-quality picture in the low-quality news picture library;

receive a type marked by the user for the low-quality picture, the type including character, animation image or black-and-white image;

store the type of each low-quality picture in the low-quality news picture library;

receive a Hamming distance threshold set by the user for each type of low-quality picture;

store, in the low-quality news picture library, the Hamming distance threshold corresponding to said each type of low-quality picture.

The present disclosure further provides a computer device, comprising:

one or more processors, a memory for storing one or more programs, the one or more programs, when executed by said one or more processors, enable said one or more processors to implement the above-mentioned method for recognizing a low-quality news resource.

The present disclosure further provides a computer readable medium on which a computer program is stored, the program, when executed by the processor, implementing the above-mentioned method for recognizing a low-quality news resource.

According to the method and apparatus for recognizing a low-quality news resource, it is feasible to obtain information of a to-be-recognized news resource; and determine whether the to-be-recognized new resource is a low-quality news resource, according to a pre-built low-quality news information repository and the information of the to-be-recognized news resource. The technical solutions of the present disclosure may be employed to automatically recognize whether the to-be-recognized news resource is the low-quality resource through the information of the to-be-recognized news resource such as the text information and/or pictures, and can overcome technical problems in the prior art such as time-consuming and arduous manual-check manner and a low recognition efficiency due to leakage in checking. Through the above technical solutions, the present embodiment may achieve automatic check of the to-be-recognized news resource and thereby substantially shorten the time spent in recognizing the low-quality news resource, save manpower costs of the check, and avoid leakage in the check, and thereby greatly improve the recognition efficiency of the low-quality news resource.

DETAILED DESCRIPTION OF PREFERRED EMBODIMENTS

The present disclosure will be described in detail with reference to figures and specific embodiments to make objectives, technical solutions and advantages of the present disclosure more apparent.

In view of the technical problem in the prior art that recognizing low-quality news resources that appear repeatedly through plagiarism in the news-recommending system in a manually-checking manner is time-consuming and arduous with a low recognition efficiency, the present disclosure provides a method of recognizing a low-quality news resources in the following embodiment, to solve the above technical problem.

Figure 1:
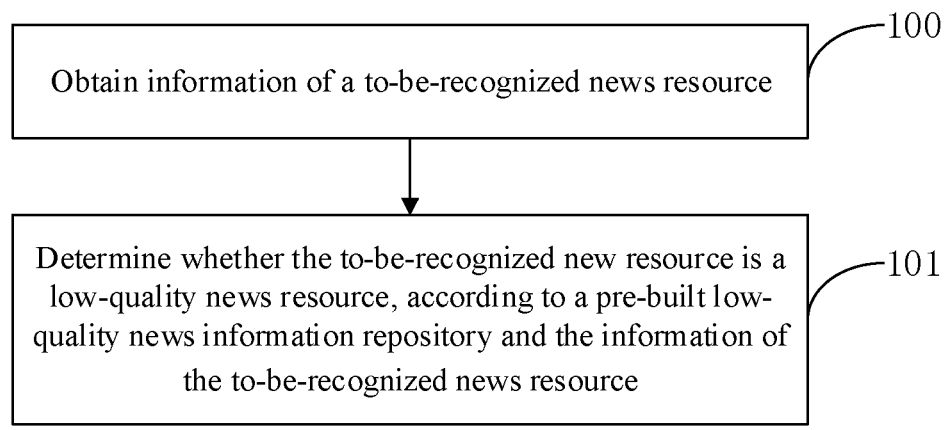
FIG. 1 is a flow chart of a first embodiment of a method for recognizing a low-quality news resource according to the present disclosure.

FIG. 1 is a flow chart of a first embodiment of a method for recognizing a low-quality news resource according to the present disclosure. As shown in FIG. 1, the method for recognizing a low-quality news resource according to the present embodiment may specifically include the following steps:

100: obtaining information of a to-be-recognized news resource;

101: determining whether the to-be-recognized new resource is a low-quality news resource, according to a pre-built low-quality news information repository and the information of the to-be-recognized news resource.

A subject for executing the method for recognizing the low-quality news resource according to the present embodiment is an apparatus for recognizing a low-quality news resource. The apparatus for recognizing a low-quality news resource may be an independent entity electronic device, or a device which is integrated on other computer devices by using software.

The to-be-recognized news resource of the present embodiment is a news resource that is not yet subject to quality verification in the news recommending system. The information of the to-be-recognized news resource may only include text information, or only include picture information, or include text information as well as picture information.

Figure 2:
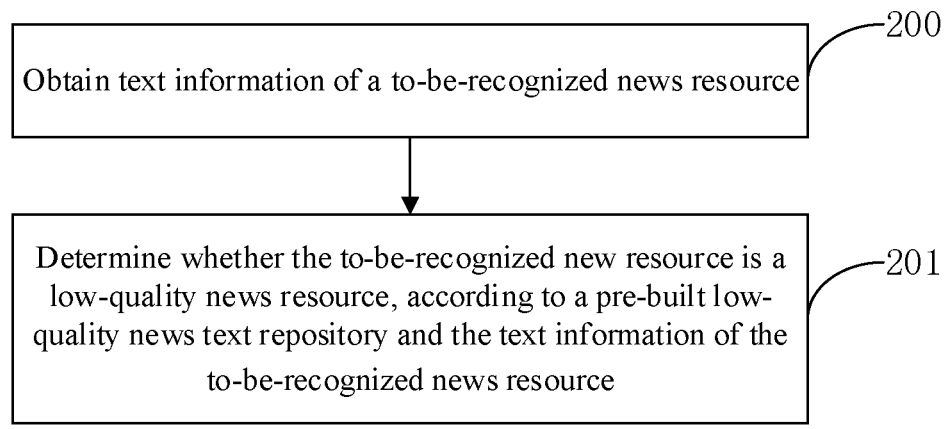
FIG. 2 is a flow chart of a second embodiment of a method for recognizing a low-quality news resource according to the present disclosure.

For example, FIG. 2 is a flow chart of a second embodiment of a method for recognizing a low-quality news resource according to the present disclosure. The technical solution of the method of recognizing a low-quality news resource according to the present embodiment of the present disclosure is described by taking an example in which the to-be-recognized news resource only includes text information, and the pre-built low-quality news information repository includes a low-quality news text repository. As shown in FIG. 2, the method of recognizing a low-quality news resource according to the present embodiment may specifically comprise the following steps:

200: obtaining text information of a to-be-recognized news resource;

The text information of the to-be-recognized news resource obtained in the present embodiment keeps paragraph situations in the news resource.

201: determining whether the to-be-recognized new resource is a low-quality news resource, according to a pre-built low-quality news text repository and the text information of the to-be-recognized news resource.

The step may specifically comprise: recognizing whether the text information of the to-be-recognized news resource is a low-quality news text, according to the low-quality news text repository and the text information of the to-be-recognized news resource; if yes, determining that the to-be-recognized news resource is a low-quality news resource; if no, determining that the to-be-recognized news resource is a non-low-quality news resource.

Further optionally, the step "recognizing whether the text information of the to-be-recognized news resource is a low-quality news text, according to the low-quality news text repository and the text information of the to-be-recognized news resource" may specifically comprise the following steps (a1)-(a7):

(a1) extracting, from the text information of the to-be-recognized news resource, a plurality of feature words that are capable of identifying the to-be-recognized news resource;

That is to say, the extracted plurality of feature words can represent the to-be-recognized news resource; for example, the plurality of feature words may be a plurality of words that occur in the to-be-recognized news resource with the highest appearance frequency. In the present embodiment, the number of the feature words is relevant to a length of the text information. The longer the text information is, a relatively larger number of feature words are extracted correspondingly; on the contrary, the shorter the text information is, a relative smaller number of feature words are extracted correspondingly. For example, the number of feature words may be 50, 100, 200 or the like. For example, a specific obtaining manner may employ the following steps:

performing word segmentation for the text information of the to-be-recognized news resource, and filtering away stop words to obtain several original segmented words; making statistics of a word frequency of the original segmented words in the text information of the to-be-recognized news resource; obtaining a plurality of original segmented words with the highest word frequency from the several original segmented words, as feature words, thereby obtaining a plurality of feature words.

In the present embodiment, when word segment is performed for the text information of the to-be-recognized news resource, it is feasible to perform word segmentation for the text information of the to-be-recognized news resource according to a current word segmentation standard, and filter away stop words from the obtained segmented words, to obtain a plurality of original segmented words included in the text information of the to-be-recognized news resource. In the present embodiment, stop words may be some words that do not have practical meaning, for example, may include words that do not contribute to the meaning of the text information of the to-be-recognized news resource, such as "的 (de)", "地 (di)", "得 (de)", "啊 (a)" and "呢 (ne)" (Chinese words). Then, it is feasible to make statistics of a word frequency of the original segmented words in the text information of the to-be-recognized news resource; and finally, obtain a plurality of original segmented words with the highest word frequency from the several original segmented words, as feature words, thereby obtaining a plurality of feature words.

(a2) according to the plurality of feature words and a pre-obtained inverted index of the low-quality news text repository, obtaining, from the low-quality news text repository, a plurality of low-quality news texts including at least one feature word of the plurality of feature words, as alternative low-quality news text, and obtaining a plurality of alternative low-quality news texts;

First, before the step (a2), the method may comprise a step of generating the low-quality news text repository, which specifically includes: collecting a plurality of low-quality news texts and generating the low-quality news text repository; performing word segmentation for paragraphs in the low-quality news text, filtering away stop words, and obtaining a plurality of first segmented words included in respective paragraphs; making statistics of weights of respective first segmented words in the respective paragraphs in the low-quality news texts; storing, in the low-quality news text repository, the weights of respective first segmented words in the respective paragraphs in the low-quality news texts.

For example, in the present embodiment, it is feasible to use the user's feedback behaviors for the news resources and manual check of the news resources to obtain low-quality news resources; and extract the text information of low-quality news resources, thereby collecting a plurality of low-quality news texts and generating the low-quality news text repository.

Each low-quality news text in the low-quality news text repository in the present embodiment is still stored according to paragraphs in the corresponding low-quality news resource. Then, it is feasible to, with a paragraph as a minimum processing unit, perform word segmentation for each paragraph in each low-quality news text, and filter away stop words to obtain a plurality of first segmented words included in the respective paragraph; specific processing of word segmentation and filtering-away of stop words will not be detailed any more here, and reference may be mad to depictions of the above relevant method.

Statistics is performed for each first segmented word in each paragraph in each low-quality news text. For example, the weight in the present embodiment may be a weight relative to a news library of the whole news-recommending system. The weight may be represented by using a score of term frequency-inverse document frequency (tf-idf), namely, a score of the first segmented word in a certain paragraph in a certain low-quality news text, or may be a product of the tf of the first segmented word in the paragraph multiplying the idf of the first segmented word in the news library of the whole news-recommending system. Reference may be made to calculation in the relevant prior art for details of the manner of calculating the score of tf-idf, which will not be detailed any more here. Furthermore, the weight for example tf-idf score of each first segmented word in each paragraph in each low-quality news text is stored in the low-quality news text repository so that it may be directly obtained and used when similarity calculation is performed subsequently.

Further optionally, the inverted index of the low-quality news text repository of the present embodiment may specifically be obtained after the low-quality news text repository is obtained, or obtained before step (a2) is performed. For example, obtaining the inverted index of the low-quality news text repository may specifically comprise: extracting all included segmented words from the low-quality news texts in the low-quality news text repository; establishing the inverted index between respective segmented words and identifiers of low-quality news texts including corresponding segmented words; making statistics of weights of respective segmented words in the low-quality news texts including corresponding segmented words; storing, in the inverted index, weights of respective segmented words in the low-quality news texts including corresponding segmented words.

Regarding each low-quality news text in the low-quality news text repository, first, word segmentation is performed for the full text, and stop words are filtered away, to obtain all segmented words included in the low-quality news text. Then, the inverted index between each segmented word and the identifier of the low-quality news text including the segmented word, so that the corresponding low-quality news text can be found quickly by searching according to the segmented word. Meanwhile, in the present embodiment, it is further necessary to make statistics of weights of segmented words in the low-quality news texts including the corresponding segmented words. Alternatively, it is also possible to directly make statistics of weights of respective segmented words in the low-quality news text in the low-quality news text box. The weight of the segmented word is 0 in the low-quality news text that does not include the segmented word. Only in the low-quality news text that includes this segmented word, a non-0 weight of a segmented word in the low-quality news text can be obtained by statistics. Likewise, the weights of the present embodiment may also be represented by using a corresponding tf-idf score.

Different from weights stored in the low-quality news text repository, what is stored in the low-quality news text repository is a weight of each first segmented word in each paragraph in each low-quality news text; what is stored in the inverted index is a weight of each segmented word in the low-quality news text including the corresponding segmented word.

Then, it is feasible to, according to a plurality of feature words obtained in step (a1) and the inverted index in the low-quality news text repository, search to find the identifier of the low-quality news text including each feature word, and thereby obtain, from the low-quality news text repository, a plurality of low-quality news texts including at least one feature word in the plurality of feature words, as alternative low-quality news texts, and obtain a plurality of alternative low-quality news texts. That is to say, each alternative low-quality news text at least includes a feature word, or might include two or more feature words, so that the alternative low-quality news text has a certain correlation with the text information of the to-be-recognized news resource, and can be used to recognize whether the text information of the to-be-recognized news resource is of low quality.

For example, it is feasible to extract a plurality of feature words for example, $w_1$, $w_2$ . . . respectively, from the text information $d_{new}$ of a certain to-be-recognized news resource. Regarding the feature word $w_1$, alternative low-quality news texts $d_3$, $d_5$ . . . including the feature word $w_1$ may be obtained from the low-quality news text repository. Regarding the feature word $w_2$, alternative low-quality news texts $d_2$, $d_4$ . . . including the feature word $w_2$ may be obtained from the low-quality news text repository.

(a3) making statistics of weighs of respective feature words in the plurality of feature words in the text information of the to-be-recognized news resource; and obtaining, from the inverted index of the low-quality news text repository, weights of the respective feature words in respective alternative low-quality news texts;

Regarding each feature word, it is possible to make statistics of the tf of the feature word in the text information in the to-be-recognized news resource, and then obtain the idf of the feature word in the news repository of the whole news-recommending system, thereby obtaining the tf-idf score of the feature word, as the weight of the feature word in the text information of the to-be-recognized news resource, and in a similar way, calculate a weight of each feature word in the text information of the to-be-recognized news resource. In addition, in the inverted index of the low-quality news text repository is stored the weight such as tf-idf score of each segmented word in the corresponding low-quality news text. As such, if the feature word hits a certain segmented word, weights of the respective alternative low-quality news texts including the feature word may be obtained from the inverted index of the low-quality news text box.

(a4) obtaining N candidate low-quality news texts from a plurality of alternative low-quality news texts, according to weights of feature words in the plurality of feature words in the text information of the to-be-recognized news resource, and weights of the feature words in respective alternative low-quality news texts;

For example, step (a4) may specifically include the following steps: calculating a relevancy score of the text information of the to-be-recognized news resource and respective alternative low-quality news texts, according to the weights of feature words in the plurality of feature words in the text information of the to-be-recognized news resource, and the weights of the feature words in respective alternative low-quality news texts; obtaining top N largest relevancy scores from the plurality of relevancy scores; obtaining N alternative low-quality news texts corresponding to the top N largest relevancy scores, as N candidate low-quality news texts.

For example, the step of "calculating a relevancy score of the text information of the to-be-recognized news resource and respective alternative low-quality news texts, according to the weights of feature words in the plurality of feature words in the text information of the to-be-recognized news resource, and the weights of the feature words in respective alternative low-quality news texts" may specifically employ the following manner: regarding respective alternative low-quality news texts, multiplying the tf-idf score of feature words in the plurality of feature words in the text information of the to-be-recognized news resource by the tf-idf score of corresponding feature words in corresponding alternative low-quality news texts, and summating multiplication results corresponding to the plurality of feature words, and regarding the sum as the relevancy score of the text information of the to-be-recognized news resource and the corresponding alternative low-quality news text.

Figure 3:
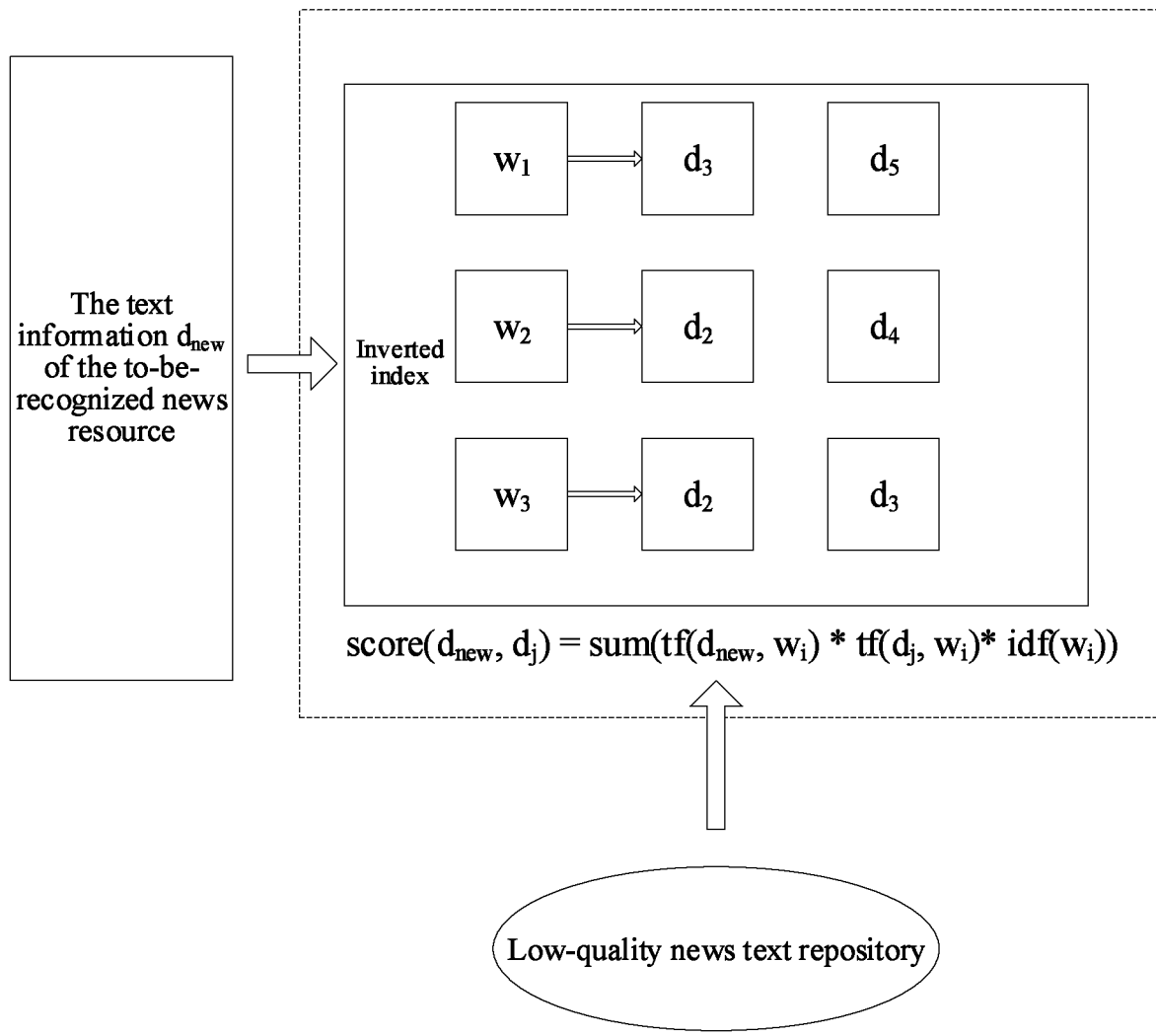
FIG. 3 is diagram showing a principle of calculating a relevancy score of an alternative low-quality news text in an embodiment of the present disclosure.

FIG. 3 is diagram showing a principle of calculating a relevancy score of an alternative low-quality news text in an embodiment of the present disclosure. As shown in FIG. 3, an example is take in which the text information of the to-be-recognized news resource includes three feature words $w_1$, $w_2$ and $w_3$. Regarding the feature word $w_1$, its weight in the text information $d_{new}$ of the to-be-recognized news resource is $tf(d_{new}, w_1)*idf(w_1)$; regarding the feature word $w_2$, its weight in the text information $d_{new}$ of the to-be-recognized news resource is $tf(d_{new}, w_2)*idf(w_2)$; regarding the feature word $w_3$, its weight in the text information $d_{new}$ of the to-be-recognized news resource is $tf(d_{new}, w_3)*idf(w_3)$. Regarding the feature word $w_1$, corresponding alternative low-quality news texts in the low-quality news text repository is $d_3$, $d_5$; regarding the feature word $w_2$, corresponding alternative low-quality news texts in the low-quality news text repository is $d_2$, $d_4$; regarding the feature word $w_3$, corresponding alternative low-quality news texts in the low-quality news text repository is $d_2$, $d_3$. In the inverted index, it is feasible to obtain the weight of the feature word $w_1$ in the alternative low-quality news text $d_3$ is $tf(d_3, w_1)*idf(w_1)$, the weight of the feature word $w_1$ in the alternative low-quality news text $d_5$ is $tf(d_5, w_1)*idf(w_1)$. It is further feasible to obtain the weight of the feature word $w_2$ in the alternative low-quality news text $d_2$ is $tf(d_2, w_2)*idf(w_2)$, and the weight of the feature word $w_2$ in the alternative low-quality news text $d_4$ is $tf(d_4, w_2)*idf(w_2)$. It is further feasible to obtain the weight of the feature word $w_3$ in the alternative low-quality news text $d_2$ is $tf(d_2, w_3) idf(w_3)$, and the weight of the feature word $w_3$ in the alternative low-quality news text $d_3$ is $tf(d_3, w_3)*idf(w_3)$.

As such, the text information of the to-be-recognized news resource and the alternative low-quality news text $d_2$ jointly include feature words $w_2$ and $w_3$, and the relevancy score of the text information of the to-be-recognized news resource and the alternative low-quality news text $d_2$ may be represented as $tf(d_{new}, w_2)*idf(w_2)*tf(d_2, w_2)*idf(w_2)+tf(d_{new}, w_3)*idf(w_3)*tf(d_2, w_3)idf(w_3)$. Likewise, the text information of the to-be-recognized news resource and the alternative low-quality news text $d_3$ jointly include feature words $w_1$ and $w_4$, and the relevancy score of the text information of the to-be-recognized news resource and the alternative low-quality news text $d_3$ may be represented as $tf(d_{new}, w_1)*idf(w_1)*tf(d_1, w_1)*idf(w_1)+tf(d_{new}, w_3)*idf(w_3)*tf(d_2, w_3)idf(w_3)$.

The text information of the to-be-recognized news resource and the alternative low-quality news text $d_4$ jointly include the feature word $w_1$, and the relevancy score of the text information of the to-be-recognized news resource and the alternative low-quality news text $d_4$ may be represented as $tf(d_{new}, w_1)*idf(w_1)*tf(d_4, w_1)*idf(w_1\ w_1)$.

If $d_j$ represents the $j^{th}$ alternative low-quality news text, the $j^{th}$ alternative low-quality news text $d_j$ and the text information $d_{new}$ of the to-be-recognized news resource jointly include $w_i$ feature words, and the relevancy score of the text information $d_{new}$ of the to-be-recognized news resource and the $j^{th}$ alternative low-quality news text $d_j$ may be represented as $score(d_{new}, d_j)=sum(tf(d_{new}, *w_i)*idf(w_i)*tf(d_j, w_i)*idf(w_i))$, namely, specifically summate products from $w_1$ to $w_i$.

Alternatively, it can be seen from the above equation that $idf(w_i)$ is multiplied twice. To reduce the calculating amount, it is feasible to reduce a product of $idf(w_i)$ one time. For example, the relevancy score of the text information $d_{new}$ of the to-be-recognized news resource and the $j^{th}$ alternative low-quality news text $d_j$ may be represented as $score(d_{new}, d_j)=sum(tf(d_{new}, w_i)*tf(d_j, w_i)*idf(w_i))$.

In other words, regarding respective alternative low-quality news texts, it is feasible to multiply a word frequency of feature words in the plurality of feature words in the text information of the to-be-recognized news resource by a word frequency of corresponding feature words in corresponding alternative low-quality news texts and an inverse file frequency of corresponding feature words, and summate multiplication results corresponding to the plurality of feature words, and regard the sum as the relevancy score of the text information of the to-be-recognized news resource and the corresponding alternative low-quality news text.

Finally, it is feasible to obtain N alternative low-quality news texts corresponding to top N largest relevancy scores from the plurality of relevancy scores corresponding to the plurality of alternative low-quality news texts, as N candidate low-quality news texts.

The embodiment shown in above FIG. 3 is only an example. In practical application, the text information of the to-be-recognized news resource include more feature words, each feature word corresponds to more alternative low-quality news texts, but its calculating manner is the same as the calculating manner of FIG. 3 so as to implement the calculation of the relevancy score of the text information of the to-be-recognized news resource and each alternative low-quality news text. Reference may be made to depictions of the above embodiments for details, which will not be presented in detail any more.

(a5) with a paragraph as a granularity, calculating a text similarity between the to-be-recognized news resource and each candidate low-quality news text;

The step (a5) may specifically include the following steps:

(b1) with a paragraph as a granularity, obtaining a first sparsity representation and a first density representation of each paragraph of a plurality of paragraphs in each candidate low-quality news text;

For example, the first sparsity representation in step (b1) may be generated in the following manner:

generating the first sparsity representation of each paragraph in each candidate low-quality news text, according to first segmented words included in all paragraphs of each candidate low-quality news text in the low-quality news text repository, and weights of the first segmented words.

Likewise, the weight of the first segmented words in each paragraph in each candidate low-quality news text of the present embodiment may be represented with the tf-idf score. In the news-recommending system, it is feasible to perform word segmentation according to the text information of news resources in a news library of the news-recommending system, and extract all segmented words in the news library to form a dictionary. For example, if the number included in the dictionary obtained from extraction is 200 k, dimensions of a vector of the generated first sparsity representation may be 200 k dimensions, and each position corresponds to a segmented word in the dictionary. If the first segmented word included in each paragraph of each candidate low-quality news text hits the segmented word at the position in the first sparsity representation, and an element value at the position is set as the tf-idf score of the first segmented word in this paragraph. As such, in the first sparsity representation, the value at the position corresponding to the first segmented word is a corresponding tf-idf score. At positions corresponding to other segmented words other than the first segmented word, since the paragraph does not include the segmented words, the value at each of these positions is 0.

For example, the first density representation in step (b1) may be generated in the following manner:

according to a subject classification model obtained by pre-learning, predicting a probability of each paragraph in the plurality of paragraphs in each candidate low-quality news text on each preset subject class; and generating the first density representation of each paragraph of each candidate low-quality news text, according to the probability of each paragraph in each candidate low-quality news text on each preset subject class.

A subject classification (Latent Dirichlet Allocation LDA) model of the present embodiment is mainly used to recognize a subject class to which a certain paragraph belongs. For example, it is possible to preset a plurality of preset subject classes, and then use several training paragraphs and known preset subject classes of the training paragraphs to train the LDA model. For example, before training, it is feasible to preset an initial parameter for the LDA model, and upon training for the first time, it is feasible to input the first training paragraph into the LDA model which predicts the preset subject class of the training paragraph, then detect whether the preset subject class of the training paragraph predicted by the LDA model is consistent with the known preset subject class, and if no, adjust the parameter of the LDA model; then in the above manner, continue to use next training paragraph to train the LDA model until the LDA model converges, determine the parameter of the LDA model, and thereby determine the LDA model.

Upon use, regarding each paragraph in the plurality of paragraphs in each candidate low-quality news text, the LDA model may be used to predict the probability of the paragraph on each preset subject class. For example, in the present embodiment, the number of the preset subject classes is T. As such, the dimensions of the vector of the first density representation of each paragraph of each candidate low-quality news text is generated as T according to the probability of each paragraph in each candidate low-quality news text on each preset subject class. In the vector of the first density representation, each position corresponds to a preset subject class. When the LDA model predicts that the probability of a certain paragraph on a certain preset subject class is not 0, in the vector of the first density representation, the value at the position corresponding to the preset subject class is a non-zero probability value. In addition, the value at the positions corresponding to other preset subject classes is set as 0 so as to obtain the first density representation of this paragraph.

(b2) with a paragraph as a granularity, obtaining a second sparsity representation and a second density representation of each paragraph of a plurality of paragraphs in the text information of the to-be-recognized news resource;

For example, the second sparsity representation in step (b2) may be generated in the following manner:

performing word segmentation for each paragraph in the text information of the to-be-recognized news resource, and filtering away stop words to obtain a plurality of second segmented words included in respective paragraphs; making statistics of weights of respective second segmented words in the respective paragraphs of the text information of the to-be-recognized news resource; generating the second sparsity representation of corresponding paragraphs in the text information of the to-be-recognized news resource, according to the weights of respective second segmented words in paragraphs of the text information of the to-be-recognized news resource;

Likewise, the processing such as word segmentation and filtering away stop words in the present embodiment will not be detailed any more here and reference may be made to depictions of the above relevant embodiments. In addition, the weights of the second segmented words in paragraphs of the text information of the to-be-recognized news resource may employ a tf-idf score of the second segmented word. For particulars, please refer to depictions of the above relevant embodiments, and will not be detailed any more. Regarding the second sparsity representation of corresponding paragraphs in the text information of the to-be-recognized news resource, please refer to the representation manner of the first sparsity representation of paragraphs of the candidate low-quality news texts. For particulars, please refer to depictions of the above relevant embodiments, and will not be detailed any more.

For example, the second density representation in step (b2) may be generated in the following manner:

according to the LDA model, predicting the probability of paragraphs of the text information of the to-be-recognized news resource on preset subject classes; and generating the second density representation of each paragraph of the text information of the to-be-generated news resource, according to the probability of each paragraph of the text information of the to-be-recognized news resource on respective preset subject classes.

Likewise, regarding the second density representation of each paragraph of the text information of the to-be-recognized news resource, please refer to the representation manner of the first sparsity representation of paragraphs of the candidate low-quality news texts in the above embodiments. For particulars, please refer to depictions of the above relevant embodiments, and will not be detailed any more.

(b3) regarding paragraphs in the candidate low-quality news texts and paragraphs in the text information of the to-be-recognized news resource, calculating a first paragraph similarity between corresponding paragraph pairs using a cosine distance, according to the first sparsity representation of paragraphs in corresponding candidate low-quality news texts and the second sparsity representation of paragraphs in the text information of the to-be-recognized news resource;

(b4) regarding paragraphs in the candidate low-quality news text and paragraphs in the text information of the to-be-recognized news resource, calculating a second paragraph similarity between corresponding paragraph pairs using a KL divergence, according to the first density representation of paragraphs in corresponding candidate low-quality resources and the second density representation of paragraphs in the text information of the to-be-recognized news resource;

In the present embodiment, the candidate low-quality news texts are compared with the text information of the to-be-recognized news resource according to a granularity of paragraphs. Specifically, each paragraph in the candidate low-quality news text and each paragraph in the text information of the to-be-recognized news resource form a paragraph pair, to calculate the first paragraph similarity and the second paragraph similarity of each paragraph pair. For example, a certain candidate low-quality news text includes A paragraphs, and the text information of the to-be-recognized new resource includes B paragraphs. Therefore, in the manner of the present embodiment, when the candidate low-quality news texts are compared with the text information of the to-be-recognized news resource, it is necessary to allow each paragraph in the A paragraphs of the candidate low-quality news text and each paragraph in the B paragraphs of the text information of the to-be-recognized news resource to form a paragraph pair for comparison. A total of A*B paragraph pairs need to be processed. Hence, this calculating manner may also be called multi-granularity similarity calculation.

Regarding each paragraph pair between each candidate low-quality news text and the text information of the to-be-recognized news resource, since the first sparsity representation of the paragraph in candidate low-quality news text and the second sparsity representation of the paragraph in the text information of the to-be-recognized news resource in the paragraph pair are both in the form of a vector, it is possible to calculate a cosine distance of the first sparsity representation and the second sparsity representation, to obtain a text similarity between the paragraph pair, and obtain the first paragraph similarity of the paragraph pair. The first paragraph similarity may include accuracy of comparison of two paragraphs in the paragraph pair.

In addition, the first density representation of the paragraph in candidate low-quality news text and the second density representation of the paragraph in the text information of the to-be-recognized news resource in the paragraph pair are both in the form of a vector, it is feasible to, through a KL divergence, calculate a similarity between the first density representation of the paragraph in candidate low-quality news text and the second density representation of the paragraph in the text information of the to-be-recognized news resource in the paragraph pair, to obtain a text similarity between the paragraph pair, and obtain the second paragraph similarity of the paragraph pair. The second paragraph similarity may determine the similarity of subjects of the two paragraphs, thereby increasing recall of more similar subject information.

Figure 4:
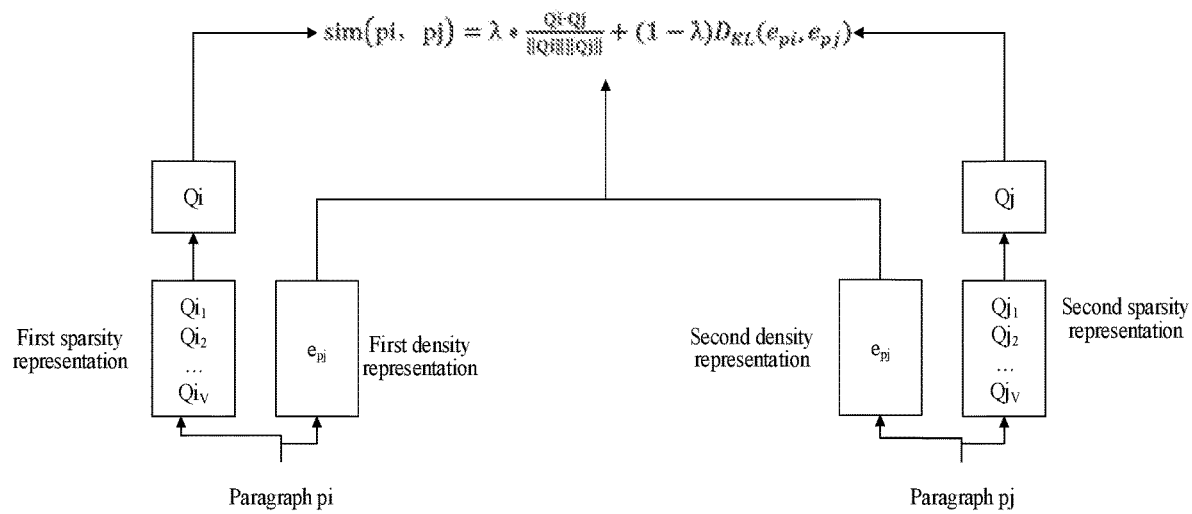
FIG. 4 is a diagram showing a principle of calculating a similarity degree between a paragraph in a candidate low-quality news text and a paragraph in text information of a to-be-recognized news resource in the present embodiment.

(b5) regarding paragraphs in the candidate low-quality news text and paragraphs in the text information of the to-be-recognized news resource, calculating a third similarity between each paragraph pair according to the first paragraph similarity and the second paragraph similarity between corresponding paragraph pairs, a parameter proportion of the sparsity representation and a parameter proportion of the density representation; a sum of the parameter proportion of the sparsity representation and the parameter proportion of the density representation is equal to 1;

For example, FIG. 4 is a diagram showing a principle of calculating a similarity degree between a paragraph in a candidate low-quality news text and a paragraph in text information of a to-be-recognized news resource in the present embodiment. As shown in FIG. 4, the technical solution of the present disclosure is described by taking an example of calculating the similarity between the paragraph pi in the candidate low-quality news text and the paragraph pj in the text information of the to-be-recognized news resource. As shown in FIG. 4, the first sparsity representation corresponding to paragraph pi is Qi. The number of dictionaries formed by words in the news library of the news-recommending system in the present embodiment is V, namely, the dimensions of the first sparsity representation is V, namely, the first sparsity representation may be specifically represented as $Qi_1, Qi_2, \ldots Qi_V$. The first density representation of paragraph pi may be represented as $e_{pi}$. The first sparsity representation corresponding to paragraph pj is Qj. Likewise, the dimensions of the second sparsity representation of Qj is also V, namely, the second sparsity representation may be specifically represented as $Qj_1, Qj_2, \ldots Qj_V$. The second density representation of paragraph pj may be represented as $e_{pj}$. As shown in FIG. 4, in the present embodiment, the third similarity between the paragraph pair formed by paragraph pi and paragraph pj may be represented as $$\text{sim}(pi, pj) = \lambda * \frac{Qi \cdot Qj}{\|Qi\| \|Qj\|} + (1 - \lambda) D_{KL}(e_{pi}, e_{pj}),$$

wherein the first paragraph similarity of the paragraph pi and paragraph pj is $$\frac{Qi \cdot Qj}{\|Qi\| \|Qj\|},$$

and the second paragraph similarity of paragraph pi and paragraph pj is $D_{KL}(e_{pi}, e_{pj})$. $\lambda$ is the parameter proportion of the sparsity representation, and $1-\lambda$ is the parameter proportion of the density representation.

In practical application, when the author of the low-quality news plagiarizes, content of another piece of news is copied in the original shape substantially without a change; besides, the author might re-describe the original, replace words in the news with synonyms, and create a new piece of news in another expression manner. The first paragraph similarity in the similarity calculating method of the present embodiment may recognize such semantic similarity situation, thereby accurately recognizing the similarity between paragraphs.

The second paragraph similarity in the present embodiment may implement recall of more similar information. For example, it is possible to precisely implement accuracy and recall by referring to different verification demands of the news system and by flexibly adjusting the magnitude of λ. For example, regarding a verifying system with manual participation, it is desirable to recall more possible low-quality resources, whereupon the value of λ may be adjusted relatively smaller. Regarding a verifying system that has no manual participation and directly filters away low-quality resources when found, it is desirable to ensure to obtain the accuracy of the low-quality resources, whereupon the value of λ may be adjusted relatively larger.

(b6) regarding paragraphs in the candidate low-quality news texts and paragraphs in the text information of the to-be-recognized news resource, multiplying the third similarity between corresponding paragraphs by a sum of lengths of two paragraphs included in the corresponding paragraph pair, to obtain a fourth similarity between each paragraph pair;

(b7) regarding the candidate low-quality news texts and the text information of the to-be-recognized news resource, obtaining top M largest fourth similarities from a plurality of fourth similarities corresponding to corresponding plurality of paragraph pairs;

(b8) regarding the candidate low-quality news texts and the text information of the to-be-recognized news resource, averaging the corresponding M fourth similarities, as the text similarity between the text information of the to-be-recognized news resource and the corresponding candidate low-quality news text.

In the present embodiment, after the third similarity between the paragraph in the candidate low-quality news texts and the paragraph in the text information of the to-be-recognized news resource is obtained, the similarity may be judged in conjunction with the lengths of the paragraphs. For example, lengths of the two paragraphs of each paragraph pair may be summated to obtain a paragraph sum. Then, it is feasible to multiply the third similarity between the paragraphs by a sum of lengths of two paragraphs included in the corresponding paragraph pair, to obtain a fourth similarity between each paragraph pair. Finally, it is feasible to average top M largest fourth similarities of all paragraph pairs between the candidate low-quality news text and the text information of the news resource, as the text similarity between the text information of the to-be-recognized news resource and the corresponding candidate low-quality news text. The manner of calculating the text similarity between the text information of the to-be-recognized news resource and the corresponding candidate low-quality news text takes into consideration lengths of paragraphs as well as the similarity of paragraphs, and is a preferred text similarity-calculating manner of the present disclosure.

In practical application, it is also feasible to take the corresponding largest fourth similarity of all paragraph pairs between the candidate low-quality news text and the text information of the to-be-recognized news resource, as the text similarity between the text information of the to-be-recognized news resource and the corresponding candidate low-quality news text.

Alternatively, it is further feasible to directly take third similarities of all paragraph pairs between the candidate low-quality news text and the text information of the to-be-recognized news resource, to average top M third similarities, as the text similarity between the text information of the to-be-recognized news resource and the corresponding candidate low-quality news text. Certainly, in practical application, it is also feasible to calculate the text similarity by employing other calculating rules according to the above-mentioned third similarity or fourth similarity. The calculating rules are not described in detail one by one any more.

(a6) performing normalization processing for the text similarity between the to-be-recognized news resource and the candidate low-quality news text;

The text similarity between the to-be-recognized news resource and each candidate low-quality news text may be calculated in the above manner. To put text similarities of different candidate low-quality news texts under one criterion for comparison, normalization processing may be performed for the text similarity between the to-be-recognized news resource and the candidate low-quality news text.

(a7) judging whether a similarity value larger than a preset similarity threshold exists in respective text similarity values after the normalization processing, and if yes, determining that the text information of the to-be-recognized news resource is the low-quality news text; if no, determining that the text information of the to-be-recognized news resource is the non-low-quality news text.

Finally, judgment is made as to whether a similarity value larger than the preset similarity threshold exists in respective text similarity values after the normalization processing. In the case of existence, this may indicate a higher similarity between the text information of the to-be-recognized news resource and a certain candidate low-quality news text, whereupon it may be directly determined that the text information of the to-be-recognized news resource is the low-quality news text. If the text similarity values after the normalization processing are all smaller than or equal to the preset similarity threshold, the similarity value larger than the preset similarity threshold does not exist in respective text similarity values after the normalization processing, and this may indicate a not high similarity between the text information of the to-be-recognized news resource and any candidate low-quality news text, whereupon it may be directly determined that the text information of the to-be-recognized news resource is the non-low-quality news text.

According to the method of recognizing a low-quality news resource of the present embodiment, the above technical solutions may be employed to automatically recognize whether the to-be-recognized news resource is the low-quality resource through the text information, and can overcome technical problems in the prior art such as time-consuming and arduous manual-check manner and a low recognition efficiency due to leakage in checking. Through the above technical solutions, the present embodiment may achieve automatic check of the to-be-recognized news resource and thereby substantially shorten the time spent in recognizing the low-quality news resource, save manpower costs of the check, and avoid leakage in the check, and thereby greatly improve the recognition efficiency of the low-quality news resource.

Figure 5:
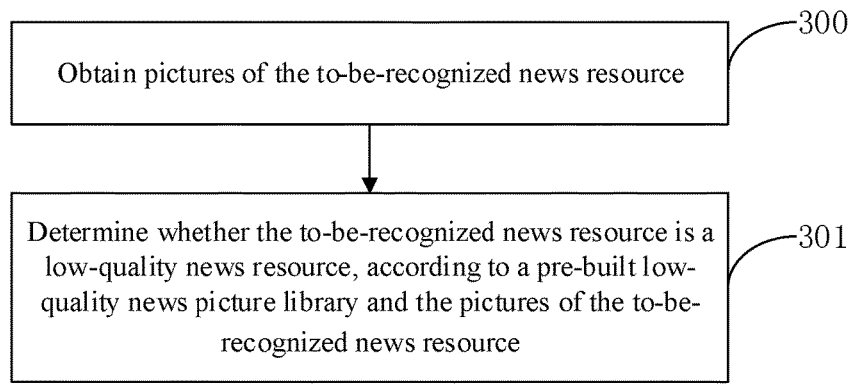
FIG. 5 is a flow chart of a third embodiment of a method for recognizing a low-quality news resource according to the present disclosure.

For example, FIG. 5 is a flow chart of a third embodiment of a method for recognizing a low-quality news resource according to the present disclosure. The technical solution about the method of recognizing the low-quality news resource according to the present embodiment of the present disclosure is described by taking an example in which the to-be-recognized news resource only includes pictures, and the pre-built low-quality news information repository includes a low-quality news picture library. As shown in FIG. 5, the method of recognizing the low-quality news resource according to the present embodiment may specifically include the following steps:

300: obtaining pictures of the to-be-recognized news resource;

301: determining whether the to-be-recognized news resource is a low-quality news resource, according to a pre-built low-quality news picture library and the pictures of the to-be-recognized news resource.

The step may specifically include: recognizing whether the pictures of the to-be-recognized news resource are low-quality pictures, according to the low-quality news picture library and the pictures of the to-be-recognized news resource; if yes, determining that the to-be-recognized news resource is the low-quality news resource; if no, determining that the to-be-recognized news resource is the non-low-quality news resource;

Optionally, the low-quality news picture library of the present embodiment may be generated before step 301, for example, specifically including: collecting a plurality of low-quality pictures and generating the low-quality news picture library; using a SIFT calculating method to calculate a feature vector of each low-quality picture in the low-quality news picture library; storing the feature vector of each low-quality picture in the low-quality news picture library; receiving a type marked by the user for the low-quality picture; and storing the type of the low-quality picture in the low-quality news picture library; receiving a Hamming distance threshold set by the user for said each type of low-quality picture; and storing, in the low-quality news picture library, the Hamming distance threshold corresponding to said each type of low-quality picture.

Specifically, it is also feasible to use the user's feedback behaviors for the news resource and manual check of the news resource, to obtain low-quality pictures and generate the low-quality news picture library. However, the low-quality news picture library of the present embodiments includes, in addition to low-quality pictures, low-quality picture-related information such as the feature vectors and types of the low-quality pictures. Specifically, it is feasible to use the SIFT calculating method to calculate a feature vector of each low-quality picture in the low-quality news picture library, and store the feature vector of each low-quality picture in the low-quality news picture library. As such, when the feature vectors of the low-quality pictures are used subsequently, the pictures may be directly obtained without performing temporary calculation. The low-quality pictures include different types, for example, may include character-type low-quality pictures, may further include animation image-type low-quality pictures, or may further include black-and-white picture type low-quality pictures. After the user collects the low-quality pictures, the low-quality pictures may be marked a type. At this time, correspondingly, it is possible to receive the type marked by the user for the low-quality picture, and store the type of each low-quality picture in the low-quality news picture library. Finally, when similarity of different types of low-quality pictures is compared, the corresponding Hamming distance threshold is not completely the same, and the user needs to set different Hamming distance thresholds for different types of low-quality pictures. Correspondingly, the apparatus for recognizing the low-quality news resource of the present embodiment receives Hamming distance thresholds set by the user for said types of low-quality pictures; and stores, in the low-quality news picture library, the Hamming distance thresholds corresponding to said types of low-quality pictures, to facilitate subsequent direct use.

As such, the low-quality news picture library generated in the present embodiment may include a plurality of low-quality pictures, the feature vector of each low-quality picture, the type of each low-quality picture and the Hamming distance threshold of each type.

For example, step 301 "recognizing whether the pictures of the to-be-recognized news resource are low-quality pictures, according to the low-quality news picture library and the pictures of the to-be-recognized news resource" may specifically comprise the following steps:

(c1) calculating feature vectors of pictures of the to-be-recognized news resource;

For example, a scale-invariant feature transform (SIFT) calculating method may be used to calculate the feature vectors of pictures of the to-be-recognized news resource.

(c2) obtaining the feature vectors of low-quality pictures from the low-quality news picture library;

During the recognition processing, the feature vectors of the low-quality pictures may be directly obtained from the low-quality news picture library generated above.

(c3) calculating Hamming distances of the feature vectors of pictures of the to-be-recognized news resource and the feature vectors of the low-quality pictures;

(c4) and judging whether a Hamming distance smaller than a Hamming distance threshold corresponding to the type of the corresponding low-quality picture exists in the Hamming distances of the feature vectors of pictures of the to-be-recognized news resource and the feature vectors of the low-quality pictures; if yes, determining that the pictures of the to-be-recognized news resource are low-quality pictures, and otherwise determining that the pictures of the to-be-recognized news resource are non-low-quality pictures.

In the present embodiment, the similarity between two pictures is judged according to the magnitude of the distance between the pictures of the to-be-recognized news resource and the feature vector of the low-quality picture. If the Hamming distance is smaller than the Hamming distance threshold corresponding to the type of the low-quality picture, this indicates that the two pictures are similar; if the Hamming distance is larger than or equal to the Hamming distance threshold corresponding to the type of the low-quality picture, this indicates that the two pictures are not similar.

In practical application, upon recognizing whether the to-be-recognized news resource is the low-quality resource, if the low-quality news picture library includes a plurality of low-quality pictures, it is necessary to calculate the Hamming distances of the picture of the to-be-recognized news resource and the feature vector of each low-quality picture in the low-quality news picture library. If the Hamming distance corresponding to one low-quality picture is smaller than the Hamming distance threshold corresponding to the corresponding low-quality picture type, this indicates that the picture of the to-be-recognized news resource is similar to the low-quality picture and it is determined that the to-be-recognized news resource is the low-quality resource; otherwise, if the Hamming distance corresponding to each low-quality picture in the low-quality news picture library is large than or equal to the Hamming distance threshold corresponding to the corresponding low-quality picture type, this indicates that the picture of the to-be-recognized news resource is not similar to each low-quality picture in the low-quality news picture library and it is determined that the to-be-recognized news resource is the non-low-quality resource.

It may be appreciated that the above embodiment is described by taking one picture of the to-be-recognized news resource as an example. In practical application, if the to-be-recognized news resource includes a plurality of pictures, it is necessary to process each picture in the to-be-recognized news resource in the manner stated in the above embodiment. If at least one picture in the to-be-recognized news resource belongs to the low-quality picture, the to-be-recognized news resource is the low-quality resource; otherwise, if all pictures in the to-be-recognized news resource are non-low-quality pictures, the to-be-recognized news resources are the non-low-quality resource.

In addition, optionally, the step 301 "recognizing whether the pictures of the to-be-recognized news resource are low-quality pictures, according to the low-quality news picture library and the pictures of the to-be-recognized news resource" may specifically comprise the following steps:

(d1) organizing feature vectors of a plurality of low-quality pictures in the low-quality news picture library on a KD-tree;

In the present embodiment, it is feasible to directly obtain the feature vectors of the low-quality pictures from the low-quality news picture library, and organize the feature vectors of the respective low-quality pictures on the KD-tree. Upon organizing, it is feasible to regard each dimension of a simhash value of the picture as a division basis in turn, thereby implementing organization of a plurality of low-quality pictures on one KD-tree. For particulars, please refer to the organization manner of the KD-tree in the prior art. Detailed depictions are not presented any more here.

(d2) calculating feature vectors of pictures of the to-be-recognized news resource;

Likewise, the SIFT calculating manner may be employed to calculate the feature vectors of pictures of the to-be-recognized news resource.

(d3) by searching on the KD-tree, obtaining the feature vector of the low-quality picture proximate to the feature vectors of pictures of the to-be-recognized news resource;

Since nodes organized on the KD-tree are feature vectors of the respective low-quality pictures, regarding the feature vectors of the pictures of the to-be-recognized news resource, the feature vector of the proximate low-quality picture is obtained by performing proximity search on the KD-tree. The proximity in the present embodiment refers to proximity in Euclidean distance. The more proximate two feature vectors are, the more similar the two feature vectors are. Therefore, it is feasible to, according to the feature vectors of pictures of the to-be-recognized news resource, search on the KD-tree to find the feature vector of the low-quality picture proximate to the feature vectors of pictures of the to-be-recognized news resource.

(d4) calculating Hamming distances of the feature vectors of pictures of the to-be-recognized news resource and the feature vector of the proximate low-quality picture;

(d5) judging whether the Hamming distances of the feature vectors of pictures of the to-be-recognized news resource and the feature vector of the proximate low-quality picture are smaller than a Hamming distance threshold corresponding to the type of the corresponding proximate low-quality picture; if yes, determining that the pictures of the to-be-recognized news resource are low-quality pictures, and otherwise determining that the pictures of the to-be-recognized news resource are non-low-quality pictures.

A comparison between the recognition process of steps (c1)-(c4) and the recognition process of step (d1)-(d5) in the present embodiment leads to the following results: the recognition process of steps (c1)-(c4) employs a pairwise comparison method in the most primitive manner, and requires a larger computing workload; regarding the recognition process of steps (d1)-(d5), it is feasible to, in a manner of organizing the KD-tree, directly obtain the feature vector of low-quality picture which is in the low-quality news picture library and proximate to the feature vectors of the pictures of the to-be-recognized news resource, then calculate the Hamming distance between the picture of the to-be-recognized news resource and the feature vector of the proximate low-quality picture, and judge whether the Hamming distance is smaller than the Hamming distance threshold corresponding to the type of the proximate low-quality picture. If the Hamming distance is smaller than the Hamming distance threshold, this indicates that the picture of the to-be-recognized news resource is similar to the proximate low-quality picture, and it is determined that the picture of the to-be-recognized news resource is the low-quality picture; otherwise, if the Hamming distance is large than or equal to the Hamming distance threshold corresponding to the type of the proximate low-quality picture, this indicates that the picture of the to-be-recognized news resource is not similar to the proximate low-quality picture and it is determined that the picture of the to-be-recognized news resource is the non-low-quality picture. As compared with the steps (c1)-(c4), the manner defined by steps (d1)-(d5) greatly reduces the computing workload and improves the recognition efficiency of the to-be-recognized news resource.

According to the method of recognizing a low-quality news resource of the present embodiment, the above technical solutions may be employed to automatically recognize whether the to-be-recognized news resource is the low-quality resource through the pictures of the to-be-recognized news resource, and can overcome technical problems in the prior art such as time-consuming and arduous manual-check manner and a low recognition efficiency due to leakage in checking. Through the above technical solutions, the present embodiment may achieve automatic check of the to-be-recognized news resource and thereby substantially shorten the time spent in recognizing the low-quality news resource, save manpower costs of the check, and avoid leakage in the check, and thereby greatly improve the recognition efficiency of the low-quality news resource.

Figure 6:
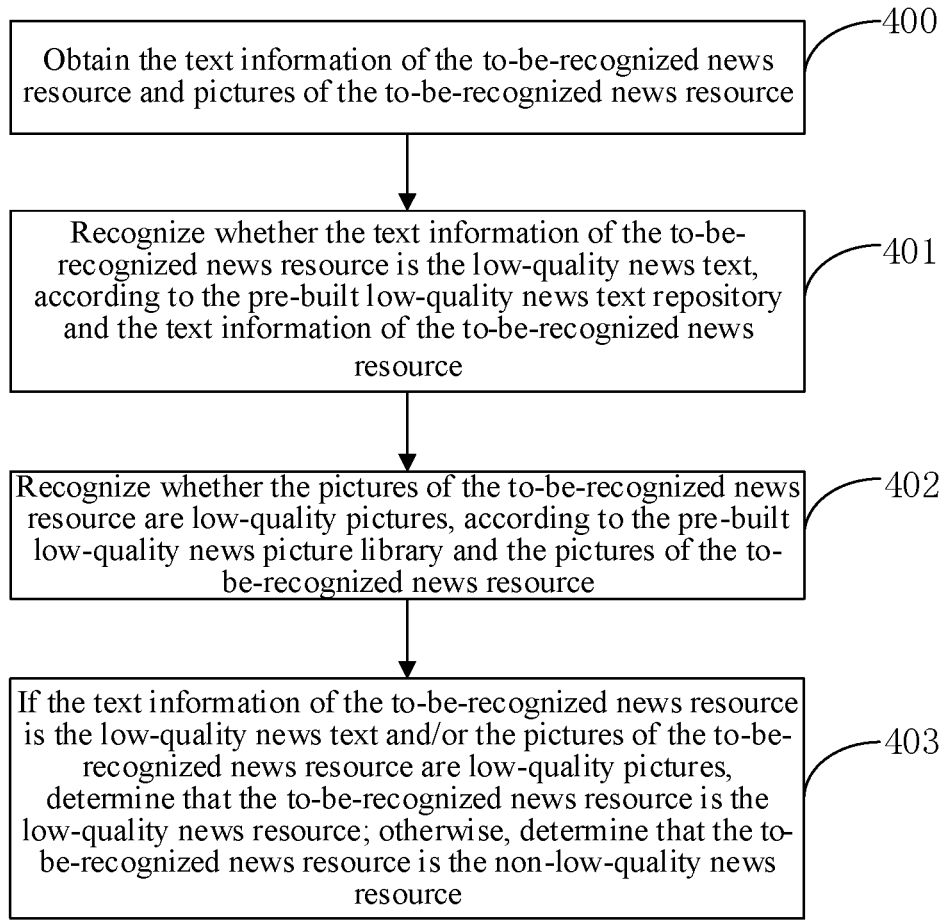
FIG. 6 is a flow chart of a fourth embodiment of a method for recognizing a low-quality news resource according to the present disclosure.

For example, FIG. 6 is a flow chart of a fourth embodiment of a method for recognizing a low-quality news resource according to the present disclosure. The technical solution about the method of recognizing the low-quality news resource according to the present embodiment of the present disclosure is described by taking an example in which the to-be-recognized news resource includes the text information and pictures, and the pre-built low-quality news information repository simultaneously includes a pre-built low-quality news text repository and a low-quality news picture library. As shown in FIG. 6, the method of recognizing the low-quality news resource according to the present embodiment may specifically include the following steps:

400: obtaining the text information of the to-be-recognized news resource and pictures of the to-be-recognized news resource;

The step is a specific implementation mode of step 100 of the embodiment shown in FIG. 1. In the present embodiment, the pre-built low-quality news information repository simultaneously includes a pre-built low-quality news text repository and a low-quality news picture library. At this time, correspondingly, step 101 may specifically include: determining whether the to-be-recognized news resource is the low-quality news resource, according to the pre-built low-quality news text repository, low-quality news picture library, and the text information and pictures of the to-be-recognized news resource.

401: recognizing whether the text information of the to-be-recognized news resource is the low-quality news text, according to the pre-built low-quality news text repository and the text information of the to-be-recognized news resource;

402: recognizing whether the pictures of the to-be-recognized news resource are low-quality pictures, according to the pre-built low-quality news picture library and the pictures of the to-be-recognized news resource;

Step 401 and step 402 may not be limited in the sequential order.

403: if the text information of the to-be-recognized news resource is the low-quality news text and/or the pictures of the to-be-recognized news resource are low-quality pictures, determining that the to-be-recognized news resource is the low-quality news resource; otherwise, determining that the to-be-recognized news resource is the non-low-quality news resource.

The above steps 401-403 are a specific implementation mode of the step "determining whether the to-be-recognized news resource is the low-quality news resource, according to the pre-built low-quality news text repository, low-quality news picture library, and the text information and pictures of the to-be-recognized news resource".

That is to say, if one of the text information and picture of the to-be-recognized news resource is of low quality, it may be determined that the to-be-recognized news resource is the low-quality news resource; otherwise, it may be determined that the to-be-recognized news resource is the non-low-quality news resource only when both of text information and picture of the to-be-recognized news resource are not of low quality.

Reference may be made to the depictions of the embodiment shown in FIG. 2 for the specific implementation mode of the step 401, and reference may be made to the depictions of the embodiment shown in FIG. 5 for the specific implementation mode of the step 402. For particulars, please refer to the above relevant embodiments. Detailed depictions are not presented any more.

According to the method of recognizing a low-quality news resource of the present embodiment, the above technical solutions may be employed to automatically recognize whether the to-be-recognized news resource is the low-quality resource through the text information and pictures of the to-be-recognized news resource, and can overcome technical problems in the prior art such as time-consuming and arduous manual-check manner and a low recognition efficiency due to leakage in checking. Through the above technical solutions, the present embodiment may achieve automatic check of the to-be-recognized news resource and thereby substantially shorten the time spent in recognizing the low-quality news resource, save manpower costs of the check, and avoid leakage in the check, and thereby greatly improve the recognition efficiency of the low-quality news resource.

Figure 7:
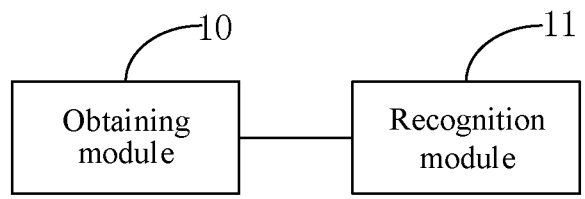
FIG. 7 is a structural schematic diagram of a first embodiment of an apparatus for recognizing a low-quality news resource according to the present disclosure.

FIG. 7 is a structural schematic diagram of a first embodiment of an apparatus for recognizing a low-quality news resource according to the present disclosure. As shown in FIG. 7, the apparatus for recognizing a low-quality news resource according to the present embodiment may specifically include: an obtaining module 10 and a recognition module 11.

The obtaining module 10 is configured to obtain information of a to-be-recognized news resource;

The recognition module 11 is configured to determine whether the to-be-recognized new resource is a low-quality news resource, according to a pre-built low-quality news information repository and the information of the to-be-recognized news resource obtained by the obtaining module 10.

Further optionally, if the to-be-recognized news resource only includes text information, the obtaining module 10 in the apparatus for recognizing a low-quality news resource of the present embodiment is specifically configured to obtain text information of the to-be-recognized news resource;

at this time, the recognition module 11 is specifically configured to:

recognize whether the text information of the to-be-recognized news resource is a low-quality news text, according to the pre-built low-quality news text repository and the text information of the to-be-recognized news resource obtained by the obtaining module 10; if yes, determine that the to-be-recognized news resource is a low-quality news resource; if no, determine that the to-be-recognized news resource is a non-low-quality news resource;

if the to-be-recognized news resource only includes pictures, the obtaining module 10 is specifically configured to obtain pictures of the to-be-recognized news resource;

at this time, the recognition module 11 is specifically configured to:

recognize whether the pictures of the to-be-recognized news resource are low-quality pictures, according to a low-quality news picture library and the pictures of the to-be-recognized news resource; if yes, determine that the to-be-recognized news resource is the low-quality news resource; if no, determine that the to-be-recognized news resource is the non-low-quality news resource;

if the to-be-recognized news resource includes text information and pictures, the obtaining module 10 is specifically configured to obtain the text information and pictures of the to-be-recognized news resource;

at this time, the recognition module 11 is specifically configured to: determine that whether the to-be-recognized news resource is the low-quality news resource, according to the pre-built low-quality news text repository, low-quality news picture library, and the text information and pictures of the to-be-recognized news resource;

furthermore, the recognition module 11 is specifically configured to:

recognize whether the text information of the to-be-recognized news resource is the low-quality news text, according to the pre-built low-quality news text repository and the text information of the to-be-recognized news resource;

recognize whether the pictures of the to-be-recognized news resource are low-quality pictures, according to the pre-built low-quality news picture library and the pictures of the to-be-recognized news resource;

if the text information of the to-be-recognized news resource is the low-quality news text and/or the pictures of the to-be-recognized news resource are low-quality pictures, determine that the to-be-recognized news resource is the low-quality news resource; otherwise, determine that the to-be-recognized news resource is the non-low-quality news resource.

Further optionally, in the apparatus for recognizing a low-quality news resource of the present embodiment, the recognition module 11 is specifically configured to:

extract, from the text information of the to-be-recognized news resource, a plurality of feature words that are capable of identifying the to-be-recognized news resource;

according to the plurality of feature words and a pre-obtained inverted index of the low-quality news text repository, obtain, from the low-quality news text repository, a plurality of low-quality news texts including at least one feature word of the plurality of feature words, as alternative low-quality news text, and obtain a plurality of alternative low-quality news texts;

make statistics of weighs of respective feature words in the plurality of feature words in the text information of the to-be-recognized news resource; and obtain, from the inverted index of the low-quality news text repository, weights of the respective feature words in respective alternative low-quality news texts;

obtain N candidate low-quality news texts from a plurality of alternative low-quality news texts, according to weights of feature words in the plurality of feature words in the text information of the to-be-recognized news resource, and weights of the feature words in respective alternative low-quality news texts;

with a paragraph as a granularity, calculate a text similarity between the to-be-recognized news resource and each candidate low-quality news text;

perform normalization processing for the text similarity between the to-be-recognized news resource and each candidate low-quality news text;

judge whether a similarity value larger than a preset similarity threshold exists in respective text similarity values after the normalization processing, and if yes, determine that the text information of the to-be-recognized news resource is the low-quality news text; if no, determine that the text information of the to-be-recognized news resource is the non-low-quality news text.

Further optionally, in the apparatus for recognizing a low-quality news resource of the present embodiment, the recognition module 11 is specifically configured to:

calculate a relevancy score of the text information of the to-be-recognized news resource and respective alternative low-quality news texts, according to the weights of feature words in the plurality of feature words in the text information of the to-be-recognized news resource, and the weights of the feature words in respective alternative low-quality news texts;

obtain top N largest relevancy scores from the plurality of relevancy scores;

obtain N alternative low-quality news texts corresponding to the top N largest relevancy scores, as N candidate low-quality news texts.

Further optionally, in the apparatus for recognizing a low-quality news resource of the present embodiment, the recognition module 11 is specifically configured to:

regarding each candidate low-quality news text, multiply a word frequency of feature words in the plurality of feature words in the text information of the to-be-recognized news resource by a word frequency of corresponding feature words in corresponding alternative low-quality news texts and an inverse file frequency of corresponding feature words, and summate multiplication results corresponding to the plurality of feature words, and regard the sum as the relevancy score of the text information of the to-be-recognized news resource and the corresponding alternative low-quality news text.

Further optionally, in the apparatus for recognizing a low-quality news resource of the present embodiment, the recognition module 11 is specifically configured to:

with a paragraph as a granularity, obtain a first sparsity representation and a first density representation of each paragraph of a plurality of paragraphs in each candidate low-quality news text;

with a paragraph as a granularity, obtain a second sparsity representation and a second density representation of each paragraph of a plurality of paragraphs in the text information of the to-be-recognized news resource;

regarding paragraphs in each candidate low-quality news text and paragraphs in the text information of the to-be-recognized news resource, calculate a first paragraph similarity between corresponding paragraph pairs using a cosine distance, according to the first sparsity representation of paragraphs in the corresponding candidate low-quality news text and the second sparsity representation of paragraphs in the text information of the to-be-recognized news resource;

regarding paragraphs in each candidate low-quality news text and paragraphs in the text information of the to-be-recognized news resource, calculate a second paragraph similarity between corresponding paragraph pairs using a KL divergence, according to the first density representation of paragraphs in corresponding candidate low-quality resources and the second density representation of paragraphs in the text information of the to-be-recognized news resource;

regarding paragraphs in each candidate low-quality news text and paragraphs in the text information of the to-be-recognized news resource, calculate a third similarity between each paragraph pair according to the first paragraph similarity and the second paragraph similarity between corresponding paragraph pairs, a parameter proportion of the sparsity representation and a parameter proportion of the density representation; a sum of the parameter proportion of the sparsity representation and the parameter proportion of the density representation is equal to 1;

regarding paragraphs in each candidate low-quality news texts and paragraphs in the text information of the to-be-recognized news resource, multiply the third similarity between corresponding paragraphs by a sum of lengths of two paragraphs included in the corresponding paragraph pair, to obtain a fourth similarity between each paragraph pair;

regarding each candidate low-quality news texts and the text information of the to-be-recognized news resource, obtain top M largest fourth similarities from a plurality of fourth similarities corresponding to corresponding plurality of paragraph pairs;

regarding each of said candidate low-quality news texts and the text information of the to-be-recognized news resource, average the corresponding M fourth similarities, as the text similarity between the text information of the to-be-recognized news resource and the corresponding candidate low-quality news text.

Further optionally, in the apparatus for recognizing a low-quality news resource of the present embodiment, the recognition module 11 is specifically configured to:

generate the first sparsity representation of each paragraph in each candidate low-quality news text, according to first segmented words included in all paragraphs of each candidate low-quality news text in the low-quality news text repository, and weights of the first segmented words;

according to a subject classification model obtained by pre-learning, predict a probability of each paragraph in the plurality of paragraphs in each candidate low-quality news text on each preset subject class; and generate the first density representation of each paragraph of each candidate low-quality news text, according to the probability of each paragraph in each candidate low-quality news text on each preset subject class.

Further optionally, in the apparatus for recognizing a low-quality news resource of the present embodiment, the recognition module 11 is specifically configured to:

perform word segmentation for each paragraph in the text information of the to-be-recognized news resource, and filter away stop words to obtain a plurality of second segmented words included in respective paragraphs;

make statistics of weights of respective second segmented words in the respective paragraphs of the text information of the to-be-recognized news resource;

generate the second sparsity representation of corresponding paragraphs in the text information of the to-be-recognized news resource, according to the weights of respective second segmented words in paragraphs of the text information of the to-be-recognized news resource;

according to a subject classification model, predict the probability of paragraphs of the text information of the to-be-recognized news resource on preset subject classes; and generate a second density representation of each paragraph of the text information of the to-be-generated news resource, according to the probability of each paragraph of the text information of the to-be-recognized news resource on respective preset subject classes.

Figure 8:
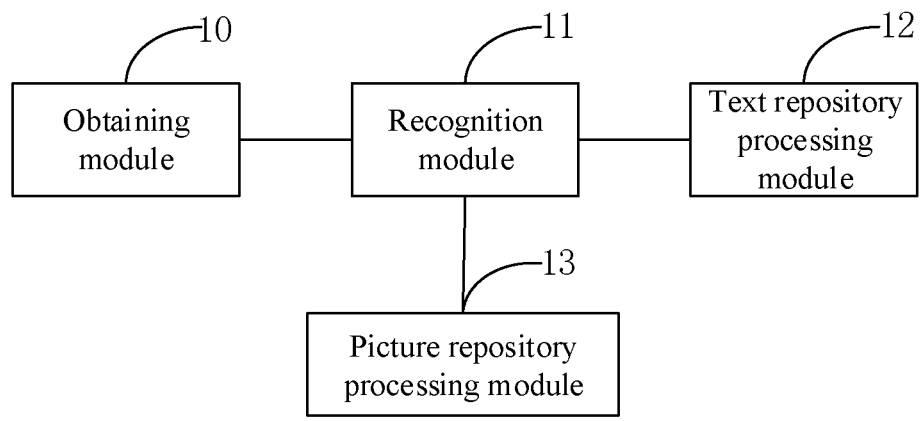
FIG. 8 is a structural schematic diagram of a second embodiment of an apparatus for recognizing a low-quality news resource according to the present disclosure.

FIG. 8 is a structural schematic diagram of a second embodiment of an apparatus for recognizing a low-quality news resource according to the present disclosure. As shown in FIG. 8, the apparatus for recognizing a low-quality news resource according to the present embodiment further include: a text repository processing module 12 configured to:

collect a plurality of low-quality news texts and generate the low-quality news text repository;

perform word segmentation for paragraphs in the low-quality news text, filter away stop words, and obtain a plurality of first segmented words included in respective paragraphs;

make statistics of weights of respective first segmented words in the respective paragraphs in the low-quality news texts;

store, in the low-quality news text repository, the weights of respective first segmented words in the respective paragraphs in each low-quality news text.

Further optionally, the text repository processing module 12 is further configured to:

extract all included segmented words from each low-quality news text in the low-quality news text repository;

establish the inverted index between respective segmented words and identifiers of low-quality news texts including corresponding segmented words;

make statistics of weights of respective segmented words in the low-quality news texts including corresponding segmented words;

store, in the inverted index, weights of respective segmented words in the low-quality news texts including corresponding segmented words.

Or when recognition is performed according to the pictures of the to-be-recognized news resource, further optionally, in the apparatus for recognizing a low-quality news resource of the present embodiment, the recognition module 11 is specifically configured to:

calculate feature vectors of pictures of the to-be-recognized news resource;

obtain the feature vectors of low-quality pictures from the low-quality news picture library;

calculate Hamming distances of the feature vectors of pictures of the to-be-recognized news resource and the feature vectors of the low-quality pictures;

judge whether a Hamming distance smaller than a Hamming distance threshold corresponding to the type of the corresponding low-quality picture exists in the Hamming distances of the feature vectors of pictures of the to-be-recognized news resource and the feature vectors of the low-quality pictures;

if yes, determine that the pictures of the to-be-recognized news resource are low-quality pictures, and otherwise determine that the pictures of the to-be-recognized news resource are non-low-quality pictures.

Or, in the apparatus for recognizing a low-quality news resource of the present embodiment, the recognition module 11 is specifically configured to:

organize feature vectors of a plurality of low-quality pictures in the low-quality news picture library on a KD-tree;

calculate feature vectors of pictures of the to-be-recognized news resource;

by searching on the KD-tree, obtain the feature vector of the low-quality picture proximate to the feature vectors of pictures of the to-be-recognized news resource;

calculate Hamming distances of the feature vectors of pictures of the to-be-recognized news resource and the feature vector of the proximate low-quality picture;

judge whether the Hamming distances of the feature vectors of pictures of the to-be-recognized news resource and the feature vector of the proximate low-quality picture are smaller than a Hamming distance threshold corresponding to the type of the corresponding proximate low-quality picture;

if yes, determine that the pictures of the to-be-recognized news resource are low-quality pictures, and otherwise determine that the pictures of the to-be-recognized news resource are non-low-quality pictures.

Further optionally, when recognition is performed according to the pictures of the to-be-recognized news resource, in the apparatus for recognizing a low-quality news resource of the present embodiment, a picture library processing module 13 configured to:

collect a plurality of low-quality pictures and generate the low-quality news picture library;

use a scale-invariant feature transform calculating method to calculate a feature vector of each low-quality picture;

store the feature vector of each low-quality picture in the low-quality news picture library;

receive a type marked by the user for the low-quality picture, the type including character, animation image or black-and-white image;

store the type of each low-quality picture in the low-quality news picture library;

receive a Hamming distance threshold set by the user for each type of low-quality picture;

store, in the low-quality news picture library, the Hamming distance threshold corresponding to said each type of low-quality picture.

At this time, correspondingly, the recognition module 11 is configured to determine whether the to-be-recognized news resource is the low-quality news resource, according to the low-quality news text repository pre-built by the text repository processing module 12 and the text information of the to-be-recognized news resource obtained by the obtaining module 10, and/or according to the low-quality news picture library pre-built by the picture library processing module 13 and the pictures of the to-be-recognized news resource obtained by the obtaining module 10.

Principles employed by the apparatus for recognizing the low-quality news resource according to the present embodiment to implement recognition of the low-quality news resource and the resultant technical effects are the same as those of the above-mentioned method embodiments. For particulars, please refer to the depictions of the aforesaid relevant method embodiments, and no detailed depictions will be presented here.

Figure 9:
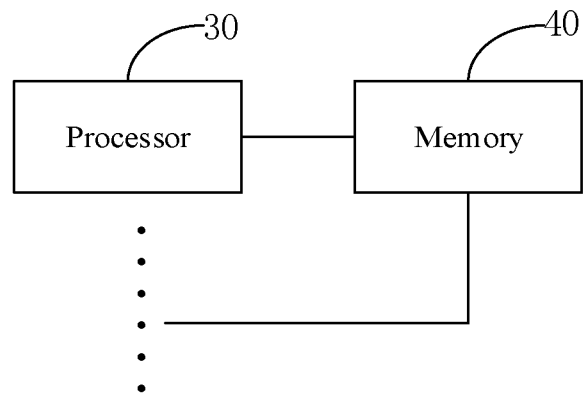
FIG. 9 is a block diagram of an embodiment of a computer device according to the present disclosure.

FIG. 9 is a block diagram of an embodiment of a computer device according to the present disclosure. As shown in FIG. 9, the computer device according to the present embodiment comprises: one or more processors 30, and a memory 40 for storing one or more programs; the one or more programs stored in the memory 40, when executed by said one or more processors 30, enable said one or more processors 30 to implement the method for recognizing a low-quality news resource shown in FIG. 1-FIG. 6. The embodiment shown in FIG. 9 exemplarily includes a plurality of processors 30.

Figure 10:
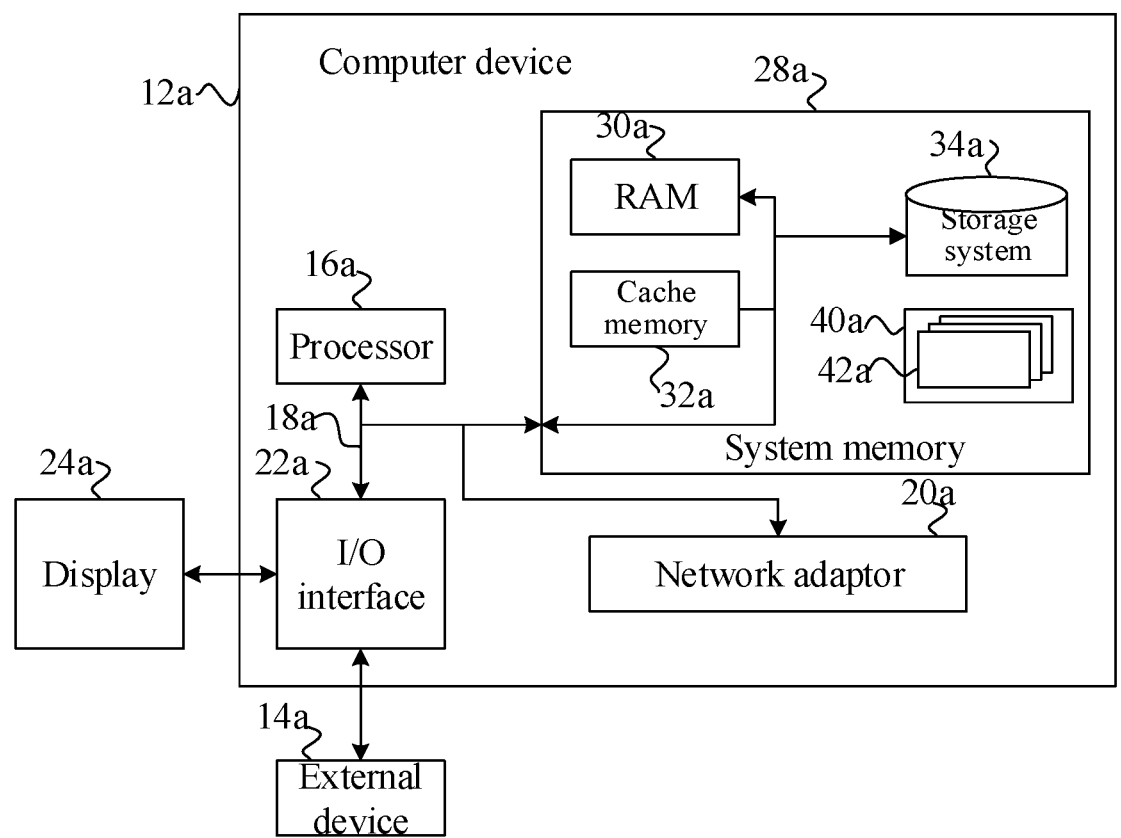
FIG. 10 is an example diagram of a computer device according to an embodiment of the present disclosure.

For example, FIG. 10 is an example diagram of a computer device according to an embodiment of the present disclosure. FIG. 10 shows a block diagram of an example computer device 12a adapted to implement an implementation mode of the present disclosure. The computer device 12a shown in FIG. 10 is only an example and should not bring about any limitation to the function and scope of use of the embodiments of the present disclosure.

As shown in FIG. 10, the computer device 12a is shown in the form of a general-purpose computing device. The components of computer device 12a may include, but are not limited to, one or more processors 16a, a system memory 28a, and a bus 18a that couples various system components including the system memory 28a and the processors 16a.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12a typically includes a variety of computer system readable media. Such media may be any available media that is accessible by computer device 12a, and it includes both volatile and non-volatile media, removable and non-removable media.

The system memory 28a can include computer system readable media in the form of volatile memory, such as random access memory (RAM) 30a and/or cache memory 32a. Computer device 12a may further include other removable/non-removable, volatile/non-volatile computer system storage media. By way of example only, storage system 34a can be provided for reading from and writing to a non-removable, non-volatile magnetic media (not shown in FIG. 10 and typically called a "hard drive"). Although not shown in FIG. 10, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18a by one or more data media interfaces. The system memory 28a may include at least one program product having a set (e.g., at least one) of program modules that are configured to carry out the functions of embodiments shown in FIG. 1-FIG. 8 of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments shown in FIG. 1-FIG. 8 of the present disclosure.

Computer device 12a may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a to communicate with one or more other computing devices. Such communication can occur via Input/Output (I/O) interfaces 22a. Still yet, computer device 12a can communicate with one or more networks such as a local area network (LAN), a general wide area network (WAN), and/or a public network (e.g., the Internet) via network adapter 20a. As depicted in FIG. 10, network adapter 20a communicates with the other communication modules of computer device 12a via bus 18a. It should be understood that although not shown, other hardware and/or software modules could be used in conjunction with computer device 12a. Examples, include, but are not limited to: microcode, device drivers, redundant processing units, external disk drive arrays, RAID systems, tape drives, and data archival storage systems, etc.

The processor 16a executes various function applications and data processing by running programs stored in the system memory 28a, for example, implements the method for recognizing a low-quality news resource shown in the above embodiments.

The present disclosure further provides a computer readable medium on which a computer program is stored, the program, when executed by the processor, implementing the method for recognizing a low-quality news resource shown in the above embodiments.

The computer readable medium of the present embodiment may include RAM 30a, and/or cache memory 32a and/or a storage system 34a in the system memory 28a in the embodiment shown in FIG. 12.

As science and technology develops, a propagation channel of the computer program is no longer limited to tangible medium, and it may also be directly downloaded from the network or obtained in other manners. Therefore, the computer readable medium in the present embodiment may include a tangible medium as well as an intangible medium.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for recognizing a low-quality news resource, wherein the method comprises:

obtaining information of a to-be-recognized news resource;

determining whether the to-be-recognized new resource is a low-quality news resource, according to a pre-built low-quality news information repository and the information of the to-be-recognized news resource, wherein if the to-be-recognized news resource only includes text information, the obtaining information of a to-be-recognized news resource specifically comprises:

obtaining text information of the to-be-recognized news resource;

the determining whether the to-be-recognized new resource is a low-quality news resource, according to a pre-built low-quality news information repository and the information of the to-be-recognized news resource specifically comprises:

recognizing whether the text information of the to-be-recognized news resource is a low-quality news text, according to the pre-built low-quality news text repository and the text information of the to-be-recognized news resource; if yes, determining that the to-be-recognized news resource is a low-quality news resource; if no, determining that the to-be-recognized news resource is a non-low-quality news resource;

if the to-be-recognized news resource only includes pictures, the obtaining information of a to-be-recognized news resource specifically comprises: obtaining pictures of the to-be-recognized news resource;

the determining whether the to-be-recognized new resource is a low-quality news resource, according to a pre-built low-quality news information repository and the information of the to-be-recognized news resource specifically comprises:

recognizing whether the pictures of the to-be-recognized news resource are low-quality pictures, according to a low-quality news picture library and the pictures of the to-be-recognized news resource; if yes, determining that the to-be-recognized news resource is the low-quality news resource; if no, determining that the to-be-recognized news resource is the non-low-quality news resource;

if the to-be-recognized news resource includes text information and pictures, the obtaining information of a to-be-recognized news resource specifically comprises:

obtaining the text information and pictures of the to-be-recognized news resource;

the determining whether the to-be-recognized new resource is a low-quality news resource, according to a pre-built low-quality news information repository and the information of the to-be-recognized news resource specifically comprises:

determining that whether the to-be-recognized news resource is the low-quality news resource, according to the pre-built low-quality news text repository, low-quality news picture library, and the text information and pictures of the to-be-recognized news resource;

furthermore, the determining that whether the to-be-recognized news resource is the low-quality news resource, according to the pre-built low-quality news text repository, low-quality news picture library, and the text information and pictures of the to-be-recognized news resource specifically comprises:

recognizing whether the text information of the to-be-recognized news resource is the low-quality news text, according to the pre-built low-quality news text repository and the text information of the to-be-recognized news resource;

recognizing whether the pictures of the to-be-recognized news resource are low-quality pictures, according to the pre-built low-quality news picture library and the pictures of the to-be-recognized news resource;

if the text information of the to-be-recognized news resource is the low-quality news text and/or the pictures of the to-be-recognized news resource are low-quality pictures, determining that the to-be-recognized news resource is the low-quality news resource;

otherwise, determining that the to-be-recognized news resource is the non-low-quality news resource.

2. The method according to claim 1, wherein the recognizing whether the text information of the to-be-recognized news resource is a low-quality news text, according to the pre-built low-quality news text repository and the text information of the to-be-recognized news resource specifically comprises:

extracting, from the text information of the to-be-recognized news resource, a plurality of feature words that are capable of identifying the to-be-recognized news resource;

according to the plurality of feature words and a pre-obtained inverted index of the low-quality news text repository, obtaining, from the low-quality news text repository, a plurality of low-quality news texts including at least one feature word of the plurality of feature words, as alternative low-quality news text, and obtaining a plurality of alternative low-quality news texts;

making statistics of weighs of respective feature words in the plurality of feature words in the text information of the to-be-recognized news resource; and obtaining, from the inverted index of the low-quality news text repository, weights of the respective feature words in respective alternative low-quality news texts;

obtaining N candidate low-quality news texts from a plurality of alternative low-quality news texts, according to weights of feature words in the plurality of feature words in the text information of the to-be-recognized news resource, and weights of the feature words in respective alternative low-quality news texts;

with a paragraph as a granularity, calculating a text similarity between the to-be-recognized news resource and each candidate low-quality news text;

performing normalization processing for the text similarity between the to-be-recognized news resource and each candidate low-quality news text;

judging whether a similarity value larger than a preset similarity threshold exists in respective text similarity values after the normalization processing, and if yes, determining that the text information of the to-be-recognized news resource is the low-quality news text; if no, determining that the text information of the to-be-recognized news resource is the non-low-quality news text.

3. The method according to claim 2, wherein the obtaining N candidate low-quality news texts from a plurality of alternative low-quality news texts, according to weights of feature words in the plurality of feature words in the text information of the to-be-recognized news resource, and weights of the feature words in respective alternative low-quality news texts specifically comprises:

calculating a relevancy score of the text information of the to-be-recognized news resource and respective alternative low-quality news texts, according to the weights of feature words in the plurality of feature words in the text information of the to-be-recognized news resource, and the weights of the feature words in respective alternative low-quality news texts;

obtaining top N largest relevancy scores from the plurality of relevancy scores;

obtaining N alternative low-quality news texts corresponding to the top N largest relevancy scores, as N candidate low-quality news texts.

4. The method according to claim 3, wherein the calculating a relevancy score of the text information of the to-be-recognized news resource and respective alternative low-quality news texts, according to the weights of feature words in the plurality of feature words in the text information of the to-be-recognized news resource, and the weights of the feature words in respective alternative low-quality news texts specifically comprises:

regarding each candidate low-quality news text, multiplying a word frequency of feature words in the plurality of feature words in the text information of the to-be-recognized news resource by a word frequency of corresponding feature words in corresponding alternative low-quality news texts and an inverse file frequency of corresponding feature words, and summating multiplication results corresponding to the plurality of feature words, and regarding the sum as the relevancy score of the text information of the to-be-recognized news resource and the corresponding alternative low-quality news text.

5. The method according to claim 2, wherein the step of, with a paragraph as a granularity, calculating a text similarity between the to-be-recognized news resource and each candidate low-quality news text specifically comprises:

with a paragraph as a granularity, obtaining a first sparsity representation and a first density representation of each paragraph of a plurality of paragraphs in each candidate low-quality news text;

with a paragraph as a granularity, obtaining a second sparsity representation and a second density representation of each paragraph of a plurality of paragraphs in the text information of the to-be-recognized news resource;

regarding paragraphs in each candidate low-quality news text and paragraphs in the text information of the to-be-recognized news resource, calculating a first paragraph similarity between corresponding paragraph pairs using a cosine distance, according to the first sparsity representation of paragraphs in the corresponding candidate low-quality news text and the second sparsity representation of paragraphs in the text information of the to-be-recognized news resource;

regarding paragraphs in each candidate low-quality news text and paragraphs in the text information of the to-be-recognized news resource, calculating a second paragraph similarity between corresponding paragraph pairs using a KL divergence, according to the first density representation of paragraphs in corresponding candidate low-quality news text and the second density representation of paragraphs in the text information of the to-be-recognized news resource;

regarding paragraphs in each candidate low-quality news text and paragraphs in the text information of the to-be-recognized news resource, calculating a third similarity between each paragraph pair according to the first paragraph similarity and the second paragraph similarity between corresponding paragraph pairs, a parameter proportion of the sparsity representation and a parameter proportion of the density representation; a sum of the parameter proportion of the sparsity representation and the parameter proportion of the density representation is equal to 1;

regarding paragraphs in each candidate low-quality news texts and paragraphs in the text information of the to-be-recognized news resource, multiplying the third similarity between corresponding paragraphs by a sum of lengths of two paragraphs included in the corresponding paragraph pair, to obtain a fourth similarity between each paragraph pair;

regarding each candidate low-quality news texts and the text information of the to-be-recognized news resource, obtaining top M largest fourth similarities from a plurality of fourth similarities corresponding to corresponding plurality of paragraph pairs;

regarding each of said candidate low-quality news texts and the text information of the to-be-recognized news resource, averaging the corresponding M fourth similarities, as the text similarity between the text information of the to-be-recognized news resource and the corresponding candidate low-quality news text.

6. The method according to claim 5, wherein the step of, with a paragraph as a granularity, obtaining a first sparsity representation and a first density representation of each paragraph of a plurality of paragraphs in each candidate low-quality news text specifically comprises:

generating the first sparsity representation of each paragraph in each candidate low-quality news text, according to first segmented words included in all paragraphs of each candidate low-quality news text in the low-quality news text repository, and weights of the first segmented words;

according to a subject classification model obtained by pre-learning, predicting a probability of each paragraph in the plurality of paragraphs in each candidate low-quality news text on each preset subject class; and generating the first density representation of each paragraph of each candidate low-quality news text, according to the probability of each paragraph in each candidate low-quality news text on each preset subject class.

7. The method according to claim 6, wherein the step of, with a paragraph as a granularity, obtaining a second sparsity representation and a second density representation of each paragraph of a plurality of paragraphs in the text information of the to-be-recognized news resource specifically comprises:

performing word segmentation for each paragraph in the text information of the to-be-recognized news resource, and filtering away stop words to obtain a plurality of second segmented words included in respective paragraphs;

making statistics of weights of respective second segmented words in the respective paragraphs of the text information of the to-be-recognized news resource;

generating the second sparsity representation of corresponding paragraphs in the text information of the to-be-recognized news resource, according to the weights of respective second segmented words in paragraphs of the text information of the to-be-recognized news resource;

according to the subject classification model, predicting the probability of paragraphs of the text information of the to-be-recognized news resource on preset subject classes;

and generating a second density representation of each paragraph of the text information of the to-be-generated news resource, according to the probability of each paragraph of the text information of the to-be-recognized news resource on respective preset subject classes.

8. The method according to claim 6, wherein before the step of, according to the plurality of feature words and a pre-obtained inverted index of the low-quality news text repository, obtaining, from the low-quality news text repository, a plurality of low-quality news texts including at least one feature word of the plurality of feature words, as alternative low-quality news text, and obtaining a plurality of alternative low-quality news texts, the method further comprises:

collecting a plurality of low-quality news texts and generating the low-quality news text repository;

performing word segmentation for paragraphs in the low-quality news text, filtering away stop words, and obtaining a plurality of first segmented words included in respective paragraphs;

making statistics of weights of respective first segmented words in the respective paragraphs in the low-quality news texts;

storing, in the low-quality news text repository, the weights of respective first segmented words in the respective paragraphs in each low-quality news text.

9. The method according to claim 8, wherein after collecting a plurality of low-quality news texts and generating the low-quality news text repository, the method further comprises:

extracting all included segmented words from each low-quality news text in the low-quality news text repository;

establishing the inverted index between respective segmented words and identifiers of low-quality news texts including corresponding segmented words;

making statistics of weights of respective segmented words in the low-quality news texts including corresponding segmented words;

storing, in the inverted index, weights of respective segmented words in the low-quality news texts including corresponding segmented words.

10. The method according to claim 1, wherein the recognizing whether the pictures of the to-be-recognized news resource are low-quality pictures, according to the pre-built low-quality news picture library and the pictures of the to-be-recognized news resource specifically comprises:

calculating feature vectors of pictures of the to-be-recognized news resource;

obtaining the feature vectors of low-quality pictures from the low-quality news picture library;

calculating Hamming distances of the feature vectors of pictures of the to-be-recognized news resource and the feature vectors of the low-quality pictures;

judging whether a Hamming distance smaller than a Hamming distance threshold corresponding to the type of the corresponding low-quality picture exists in the Hamming distances of the feature vectors of pictures of the to-be-recognized news resource and the feature vectors of the low-quality pictures;

if yes, determining that the pictures of the to-be-recognized news resource are low-quality pictures, and otherwise determining that the pictures of the to-be-recognized news resource are non-low-quality pictures.

11. The method according to claim 1, wherein the recognizing whether the pictures of the to-be-recognized news resource are low-quality pictures, according to the pre-built low-quality news picture library and the pictures of the to-be-recognized news resource specifically comprises:

organizing feature vectors of a plurality of low-quality pictures in the low-quality news picture library on a KD-tree;

calculating feature vectors of pictures of the to-be-recognized news resource;

by searching on the KD-tree, obtaining the feature vector of the low-quality picture proximate to the feature vectors of pictures of the to-be-recognized news resource;

calculating Hamming distances of the feature vectors of pictures of the to-be-recognized news resource and the feature vector of the proximate low-quality picture;

judging whether the Hamming distances of the feature vectors of pictures of the to-be-recognized news resource and the feature vector of the proximate low-quality picture are smaller than a Hamming distance threshold corresponding to the type of the corresponding proximate low-quality picture;

if yes, determining that the pictures of the to-be-recognized news resource are low-quality pictures, and otherwise determining that the pictures of the to-be-recognized news resource are non-low-quality pictures.

12. The method according to claim 10, wherein before the recognizing whether the pictures of the to-be-recognized news resource are low-quality pictures, according to the pre-built low-quality news picture library and the pictures of the to-be-recognized news resource, the method further comprises:

collecting a plurality of low-quality pictures and generating the low-quality news picture library;

using a scale-invariant feature transform calculating method to calculate a feature vector of each low-quality picture;

storing the feature vector of each low-quality picture in the low-quality news picture library;

receiving a type marked by the user for the low-quality picture, the type including character, animation image or black-and-white image;

storing the type of each low-quality picture in the low-quality news picture library;

receiving a Hamming distance threshold set by the user for each type of low-quality picture;

storing, in the low-quality news picture library, the Hamming distance threshold corresponding to said each type of low-quality picture.

13. A computer device, wherein the device comprises:
one or more processors,
a memory for storing one or more programs,
the one or more programs, when executed by said one or more processors, enable said one or more processors to implement a method for recognizing a low-quality news resource, wherein the method comprises:
obtaining information of a to-be-recognized news resource;
determining whether the to-be-recognized new resource is a low-quality news resource, according to a pre-built low-quality news information repository and the information of the to-be-recognized news resource, wherein if the to-be-recognized news resource only includes text information, the obtaining information of a to-be-recognized news resource specifically comprises:

obtaining text information of the to-be-recognized news resource;

the determining whether the to-be-recognized new resource is a low-quality news resource, according to a pre-built low-quality news information repository and the information of the to-be-recognized news resource specifically comprises:

recognizing whether the text information of the to-be-recognized news resource is a low-quality news text, according to the pre-built low-quality news text repository and the text information of the to-be-recognized news resource; if yes, determining that the to-be-recognized news resource is a low-quality news resource; if no, determining that the to-be-recognized news resource is a non-low-quality news resource;

if the to-be-recognized news resource only includes pictures, the obtaining information of a to-be-recognized news resource specifically comprises: obtaining pictures of the to-be-recognized news resource;

the determining whether the to-be-recognized new resource is a low-quality news resource, according to a pre-built low-quality news information repository and the information of the to-be-recognized news resource specifically comprises:

recognizing whether the pictures of the to-be-recognized news resource are low-quality, pictures, according to a low-quality news picture library and the pictures of the to-be-recognized news resource; if yes, determining that the to-be-recognized news resource is the low-quality news resource; if no, determining that the to-be-recognized news resource is the non-low-quality news resource;

if the to-be-recognized news resource includes text information and pictures, the obtaining information of a to-be-recognized news resource specifically comprises:

obtaining the text information and pictures of the to-be-recognized news resource;

the determining whether the to-be-recognized new resource is a low-quality news resource, according to a pre-built low-quality news information repository and the information of the to-be-recognized news resource specifically comprises:

determining that whether the to-be-recognized news resource is the low-quality news resource, according to the pre-built low-quality news text repository, low-quality news picture library, and the text information and pictures of the to-be-recognized news resource;

furthermore, the determining that whether the to-be-recognized news resource is the low-quality news resource, according to the pre-built low-quality news text repository, low-quality news picture library, and the text information and pictures of the to-be-recognized news resource specifically comprises:

recognizing whether the text information of the to-be-recognized news resource is the low-quality news text, according to the pre-built low-quality news text repository and the text information of the to-be-recognized news resource;

recognizing whether the pictures of the to-be-recognized news resource are low-quality pictures, according to the pre-built low-quality news picture library and the pictures of the to-be-recognized news resource;

if the text information of the to-be-recognized news resource is the low-quality news text and/or the pictures of the to-be-recognized news resource are low-quality pictures, determining that the to-be-recognized news resource is the low-quality news resource;

otherwise, determining that the to-be-recognized news resource is the non-low-quality news resource.

14. The computer device according to claim 13, wherein the recognizing whether the text information of the to-be-recognized news resource is a low-quality news text, according to the pre-built low-quality news text repository and the text information of the to-be-recognized news resource specifically comprises:

extracting, from the text information of the to-be-recognized news resource, a plurality of feature words that are capable of identifying the to-be-recognized news resource;

according to the plurality of feature words and a pre-obtained inverted index of the low-quality news text repository, obtaining, from the low-quality news text repository, a plurality of low-quality news texts including at least one feature word of the plurality of Feature words, as alternative low-quality news text, and obtaining a plurality of alternative low-quality news texts;

making statistics of weighs of respective feature words in the plurality of feature words in the text information of the to-be-recognized news resource; and obtaining, from the inverted index of the low-quality news text repository, weights of the respective feature words in respective alternative low-quality news texts;

obtaining N candidate low-quality news texts from a plurality of alternative low-quality news texts, according to weights of feature words in the plurality of feature words in the text information of the to-be-recognized news resource, and weights of the feature words in respective alternative low-quality news texts;

with a paragraph as a granularity, calculating a text similarity between the to-be-recognized news resource and each candidate low-quality news text;

performing normalization processing for the text similarity between the to-be-recognized news resource and each candidate low-quality news text;

judging whether a similarity value larger than a preset similarity threshold exists in respective text similarity values after the normalization processing, and if yes, determining that the text information of the to-be-recognized news resource is the low-quality news text; if no, determining that the text information of the to-be-recognized news resource is the non-low-quality news text.

15. The computer device according to claim 14, wherein the obtaining N candidate low-quality news texts from a plurality of alternative low-quality news texts, according to weights of feature words in the plurality of feature words in the text information of the to-be-recognized news resource, and weights of the feature words in respective alternative low-quality news texts specifically comprises:

calculating a relevancy score of the text information of the to-be-recognized news resource and respective alternative low-quality news texts, according to the weights of feature words in the plurality of feature words in the text information of the to-be-recognized news resource, and the weights of the feature words in respective alternative low-quality news texts;

obtaining top N largest relevancy scores from the plurality of relevancy scores;

obtaining N alternative low-quality news texts corresponding to the top N largest relevancy scores, as N candidate low-quality news texts.

16. The computer device according to claim 15, wherein the calculating a relevancy score of the text information of the to-be-recognized news resource and respective alternative low-quality news texts, according to the weights of feature words in the plurality of feature words in the text information of the to-be-recognized news resource, and the weights of the feature words in respective alternative low-quality news texts specifically comprises:

regarding each candidate low-quality news text, multiplying a word frequency of feature words in the plurality of feature words in the text information of the to-be-recognized news resource by a word frequency of corresponding feature words in corresponding alternative low-quality news texts and an inverse file frequency of corresponding feature words, and summating multiplication results corresponding to the plurality of feature words, and regarding the sum as the relevancy score of the text information of the to-be-recognized news resource and the corresponding alternative low-quality news text.

17. The computer device according to claim 14, wherein the step of, with a paragraph as a granularity, calculating a text similarity between the to-be-recognized news resource and each candidate low-quality news text specifically comprises:

with a paragraph as a granularity, obtaining a first sparsity representation and a first density representation of each paragraph of a plurality of paragraphs in each candidate low-quality news text;

with a paragraph as a granularity, obtaining a second sparsity representation and a second density representation of each paragraph of a plurality of paragraphs in the text information of the to-be-recognized news resource;

regarding paragraphs in each candidate low-quality news text and paragraphs in the text information of the to-be-recognized news resource, calculating a first paragraph similarity between corresponding paragraph pairs using a cosine distance, according to the first sparsity representation of paragraphs in the corresponding candidate low-quality news text and the second sparsity representation of paragraphs in the text information of the to-be-recognized news resource;

regarding paragraphs in each candidate low-quality news text and paragraphs in the text information of the to-be-recognized news resource, calculating a second paragraph similarity between corresponding paragraph pairs using a KL divergence, according to the first density representation of paragraphs in corresponding candidate low-quality news text and the second density representation of paragraphs in the text information of the to-be-recognized news resource;

regarding paragraphs in each candidate low-quality news text and paragraphs in the text information of the to-be-recognized news resource, calculating a third similarity between each paragraph pair according to the first paragraph similarity and the second paragraph similarity between corresponding paragraph pairs, a parameter proportion of the sparsity representation and a parameter proportion of the density representation; a sum of the parameter proportion of the sparsity representation and the parameter proportion of the density representation is equal to 1;

regarding paragraphs in each candidate low-quality news texts and paragraphs in the text information of the to-be-recognized news resource, multiplying the third similarity between corresponding paragraphs by a sum of lengths of two paragraphs included in the corresponding paragraph pair, to obtain a fourth similarity between each paragraph pair;

regarding each candidate low-quality news texts and the text information of the to-be-recognized news resource, obtaining top M largest fourth similarities from a plurality of fourth similarities corresponding to corresponding plurality of paragraph pairs;

regarding each of said candidate low-quality news texts and the text information of the to-be-recognized news resource, averaging the corresponding M fourth similarities, as the text similarity between the text information of the to-be-recognized news resource and the corresponding candidate low-quality news text.

18. A non-transitory computer readable medium on which a computer program is stored, wherein the program, when executed by a processor, implements a method for recognizing a low-quality news resource, wherein the method comprises:

obtaining information of a to-be-recognized news resource;

determining whether the to-be-recognized new resource is a low-quality news resource, according to a pre-built low-quality news information repository and the information of the to-be-recognized news resource, wherein if the to-be-recognized news resource only includes text information, the obtaining information of a to-be-recognized news resource specifically comprises:

obtaining text information of the to-be-recognized news resource;

the determining whether the to-be-recognized new resource is a low-quality news resource, according to a pre-built low-quality news information repository and the information of the to-be-recognized news resource specifically comprises:

recognizing whether the text information of the to-be-recognized news resource is a low-quality news text, according to the pre-built low-quality news text repository and the text information of the to-be-recognized news resource; if yes, determining that the to-be-recognized news resource is a low-quality news resource; if no, determining that the to-be-recognized news resource is a non-low-quality news resource;

if the to-be-recognized news resource only includes pictures, the obtaining information of a to-be-recognized news resource specifically comprises: obtaining pictures of the to-be-recognized news resource;

the determining whether the to-be-recognized new resource is a low-quality news resource, according to a pre-built low-quality news information repository and the information of the to-be-recognized news resource specifically comprises:

recognizing whether the pictures of the to-be-recognized news resource are low-quality pictures, according to a low-quality news picture library and the pictures of the to-be-recognized news resource; if yes, determining that the to-be-recognized news resource is the low-quality news resource; if no, determining that the to-be-recognized news resource is the non-low-quality news resource;

if the to-be-recognized news resource includes text information and pictures, the obtaining information of a to-be-recognized news resource specifically comprises:

obtaining the text information and pictures of the to-be-recognized news resource;

the determining whether the to-be-recognized new resource is a low-quality news resource, according to a pre-built low-quality news information repository and the information of the to-be-recognized news resource specifically comprises:

determining that whether the to-be-recognized news resource is the low-quality news resource, according to the pre-built low-quality news text repository, low-quality news picture library, and the text information and pictures of the to-be-recognized news resource;

furthermore, the determining that whether the to-be-recognized news resource is the low-quality news resource, according to the pre-built low-quality news text repository, low-quality news picture library, and the text information and pictures of the to-be-recognized news resource specifically comprises:

recognizing whether the text information of the to-be-recognized news resource is the low-quality news text, according to the pre-built low-quality news text repository and the text information of the to-be-recognized news resource;

recognizing whether the pictures of the to-be-recognized news resource are low-quality pictures, according to the pre-built low-quality news picture library and the pictures of the to-be-recognized news resource;

if the text information of the to-be-recognized news resource is the low-quality news text and/or the pictures of the to-be-recognized news resource are low-quality pictures, determining that the to-be-recognized news resource is the low-quality news resource;

otherwise, determining that the to-be-recognized news resource is the non-low-quality news resource.

* * * * *